United States Patent
Fathallah et al.

(12) 
(10) Patent No.: US 6,381,053 B1
(45) Date of Patent: Apr. 30, 2002

(54) FAST FREQUENCY HOPPING SPREAD SPECTRUM FOR CODE DIVISION MULTIPLE ACCESS COMMUNICATION NETWORKS (FFH-CDMA)

(75) Inventors: Habib Fathallah, Ste-Foy; Leslie Ann Rusch, Sillery; Sophie La Rochelle, Cap-Rouge, all of (CA)

(73) Assignee: Universite Laval, Montreal (CA)

( * ) Notice: Subject to any disclaimer, the term of this patent is extended or adjusted under 35 U.S.C. 154(b) by 0 days.

(21) Appl. No.: 09/192,180

(22) Filed: Oct. 8, 1998

(51) Int. Cl.$^7$ .................................................. H01J 14/08
(52) U.S. Cl. ....................... 359/136; 359/130; 370/347; 375/132
(58) Field of Search .................................. 359/136, 130, 359/138, 140; 375/132; 370/320, 335, 337, 342, 347

(56) References Cited

U.S. PATENT DOCUMENTS 5,438,440 A    8/1995  Paek et al.
5,446,809 A  * 8/1995  Fritz et al. ..................... 385/17

OTHER PUBLICATIONS

H. Fathallah and L. Rusch, "Robust Optical FFH–CDMA Communications: Coding in Place of Frequency and Temperature Controls", IEEE Journal of Lightwave Technology, vol. 17, pp. 1284–1293, Aug. 1999.*
H. Fathallah and L. Rusch, "Robust Optical FFH–CDMA Communications: Coding Avoids Frequency/Temperature Controls", Eleventh Tyrrhenian Intl. Workshop on Dig. Comm.: "The Optical Network Layer: Management, Systems and Technologies", pp. 312–323, Portofino.*

H. Fathallah, S. Larochelle and L. A. Rusch "Analysis of an optical frequency–hop encoder with strain–tuned Bragg gratings," OSA Topical Meeting on Bragg Gratings, Photosensitivity and Polling in Glass Waveguide, pp. 200–202, Oct. 27, 1997.

(List continued on next page.)

*Primary Examiner*—Thomas Mullen
(74) *Attorney, Agent, or Firm*—Ogilvy Renault; James Anglehart

(57) ABSTRACT

An improved method and apparatus for optical and radio frequency implementation of a fast frequency hopping spread spectrum communication for code division multiple access systems is disclosed. The method avoids the frequency hopping synthesizer requirements in the transmitter as well as in the receiver. In a system where a pool of CDMA users share a channel characterized by a number of F available frequencies (or frequency bands), each user is assigned a subset of M (M less than or equal to F) frequencies from the F available frequencies, selected and ordered in time as prescribed by his own code (or address). In the transmitter, the information bit sequence modulates a broadband source so that the energy assigned to a data bit is concentrated on just a short interval of the bit period which is less than or equal to the so-called chip interval. The data modulated signal enters equipment which simultaneously or sequentially performs three functions: 1) spectral slicing of the input signal into chip pulses, 2) a chip-pulse modulation and 3) a chip-pulse delaying. The output is an FFHSS signal composed from M sub-pulses (or chip-pulses), each of which is centered at different frequency and ordered in time as fixed by the FFH code. In an optical implementation, a broadband source and a set of in-line fiber Bragg gratings performs the FFHSS encoding and decoding operations with ASK chip-modulation. The gratings can be tuned to allow the programmability of the encoding/decoding system.

20 Claims, 20 Drawing Sheets

OTHER PUBLICATIONS

H. Fathallah, L. A. Rusch and S. Larochelle "Optical Frequency–Hop Multiple Access Communications System," IEEE International Conference on Communications, 1998, Atlanta, paper 36–2, Jun. 1998.

L.–P. Boulianne and L.A. Rusch "New Architecture & Codes for Optical Frequency–Hopping Multiple Access" ICAPT 1998.

P.–Y. Cortes, H. Fathallah, S. Larochelle, L. A. Rusch, Loiselle: "Writing of Bragg Gratings with Wavelength Flexibility Using a Sagnac Type Interferometer and Application to FH–CDMA". European Conference on Optical Communications, ECC'98, Madrid, WdA15, Sep. 1998.

H. Fathallah, L. A. Rusch, S. Larochelle "Passive Optical Fast Frequency–Hop CDMA Communications System," IEEE Journal of Lightwave Technology, vol. 17, No. 3, pp. 397–405, Mar. 1999.

H. Fathallah., P.–Y. Cortes, L. A. Rusch and S. Larochelle., "Experimental Demonstration of an Optical Fast Frequency Hopping–CDMA Communications System, " ECOC '99 Sep. 99, Nice, France.

K., Fouli, H. Fathallah, M. Menif and L. A., Rusch, "Equalization Advantages of Optical FFH–CDMA over WDM in EDFAs" Submitted to ICAPT, Jan. 2000.

H. Fathallah, L. A. Rusch, "Economically Feasible Optical Code Division Multiple Access," submitted to IEEE Network Magazine, Special issue on Optical networks, Jan. 2000.

H. Fathallah., P.–Y. Cortes, Ben Jaafar, H., L. A. Rusch and S. Larochelle., "Optical fast frequency Hopping– (OFFH–) CDMA: System capacity and Experimental Advances," submitted to IEEE Journal of Lightwave Technology, Special issue on Optical networks, Apr. 2000.

Chen, L.R., Benjamin, S.D., Smith, P.W.E., SIPE, J. E. "Applications of Ultrashort Pulse Propagation in Bragg Gratings for Wavelength Division Multiplexing and Code–Division Multiple Access," IEEE Journal of Quantum Electronics, vol. 34, No. 11, Nov. 1998.

Geiger, H., Fu A., IBSEN M., Richardson D.J., Laming, R.I., "Demonstration of a Simple CDMA Transmitter and Receiver Using Sampled Fiber Gratings," ECOC '98, Sep. 20–24, Madrid, Spain pp. 597–598.

Town, G.E., Yoffe, G., Chan, K., "Optical Pulse Code Generation using Optical Fibre Gratings," ECOC '98, Sep. 20–24, Madrid, Spain pp. 597–598.

Wang, X., Chan, K.T., Liu, Y., Zhang, L., and Benion, I., "Novel temporal/spectral coding technique based on fiber Bragg gratings for fiber optic CDMA application," Optical Fiber Conference, WM50–1, pp. 341–343, Feb. 1999.

Hunter, D.B., Minasian, R.A., "Programmable high–speed optical code recognition using fibre Bragg grating arrays," Electronics Letters, $4^{th}$ Mar. 1999, vol. 35, No. 5 pp. 412–414.

A. G. Jepsen, A. E. Johnson, E. S. Maniloff, Mossberg, T.W., Munroe, M.J., Sweetser, J.N., "Fiber Bragg grating based spectral encoder/decoder for lightwave CDMA," Electronics Letters, $24^{th}$ Jun. 1999, vol. 35, No. 13 pp. 1096–1097.

Wada, N., Sotobayashi, H., Kitayama, K.–Y. "Error–Free transmission of 2–Channel 2.5 Gbit/s Time–Spread/Wavelength–Hop OCDM using Fibre Bragg Grating with Supercontinuum Light Source," European conference on Optical communications, Nice, France, Sep. 1992, 2 pages.

Yegnanarayanan, S., Asuri, B., Jalali, B., "An incoherent Wavelength Hopping/time Spreading code–division multiple Access system," European conference on Optical communications, WM50–1, Nice, France, Sep. 1999, pp. I–188–I–189.

Yu, K., Shin, J., Park, N., "Novel wavelength–time spreading optical CDMA system using arrayed–waveguide grating," Optical Fiber Conference, FD6–1, pp. 71–73, Mar. 2000.

J. A. Salehi and E. G. Paek, "Holographic CDMA", IEEE Transactions on Communications, vol. 43, No. 9, Sep. 1995, pp. 2434–2438.

* cited by examiner

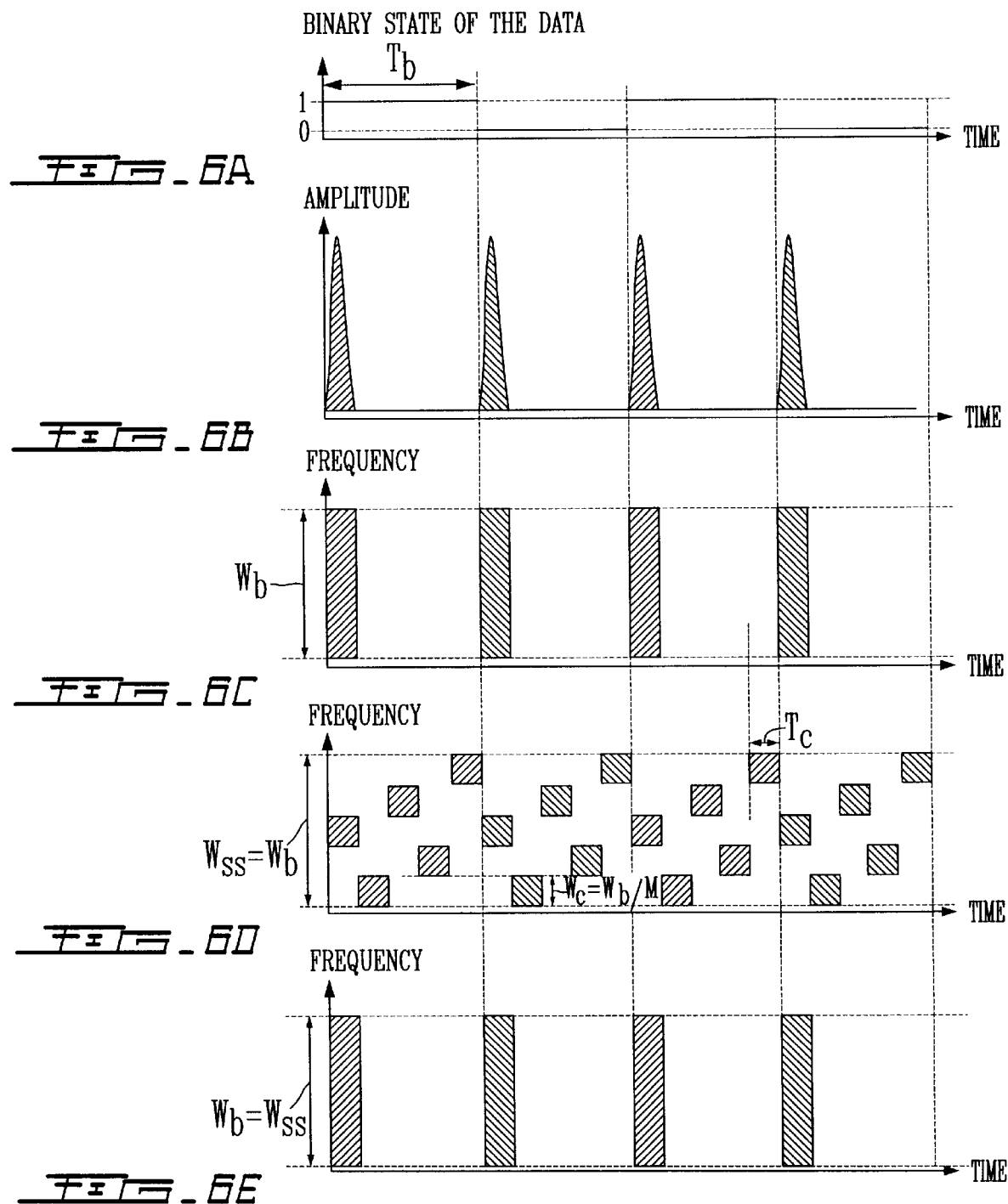

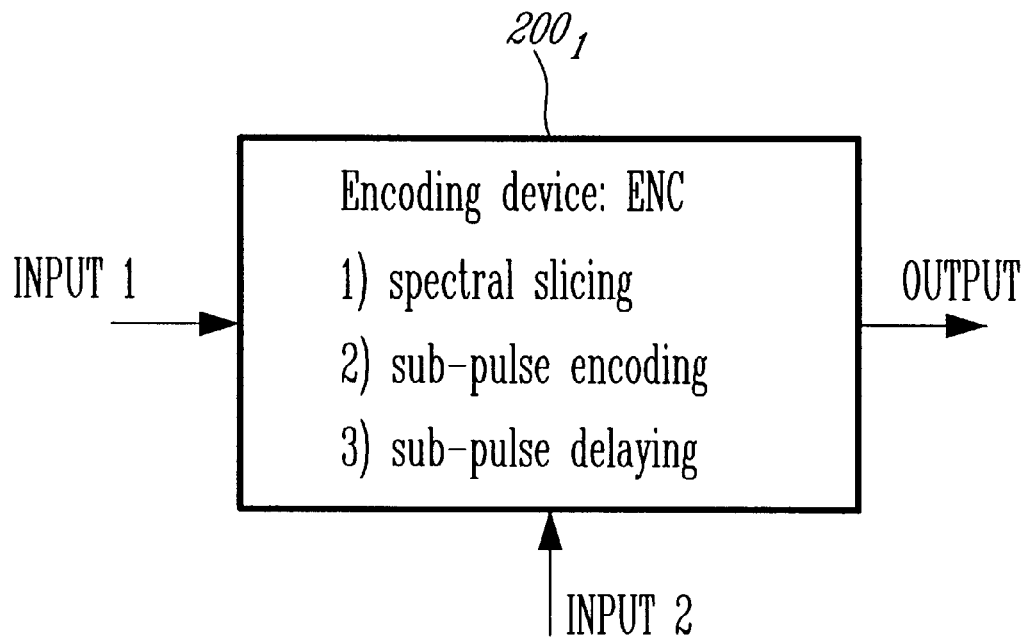
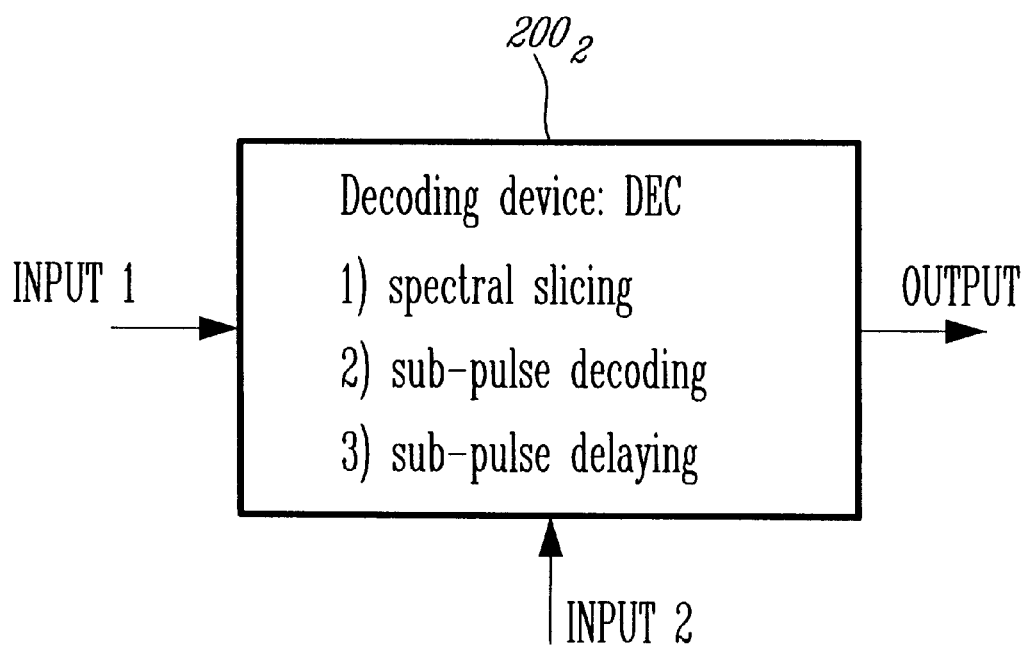

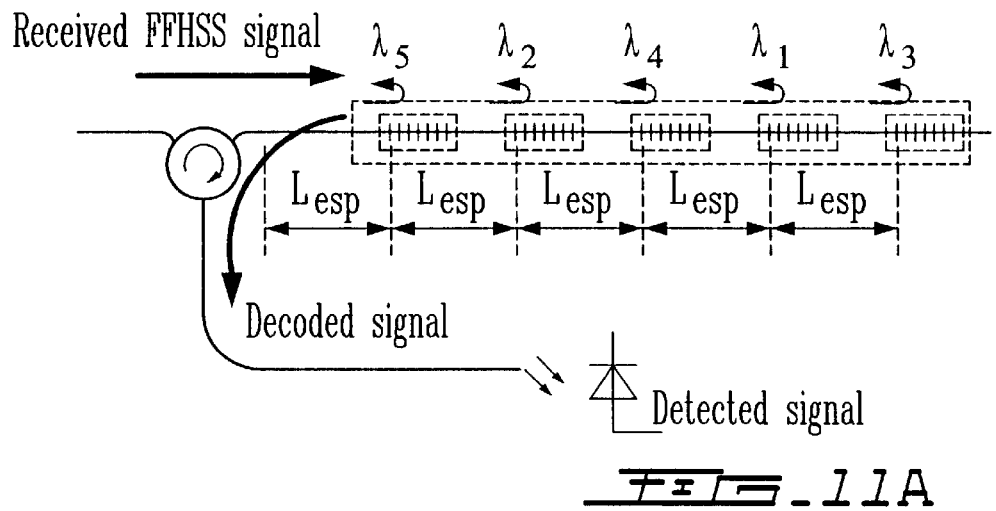
FIG_11A
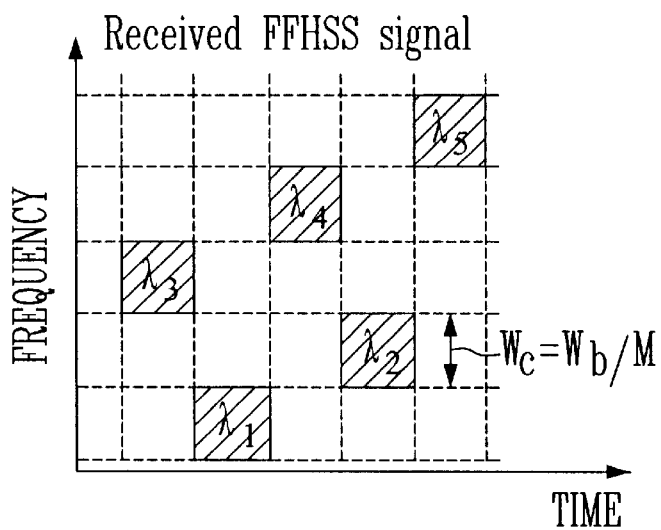
FIG_11B
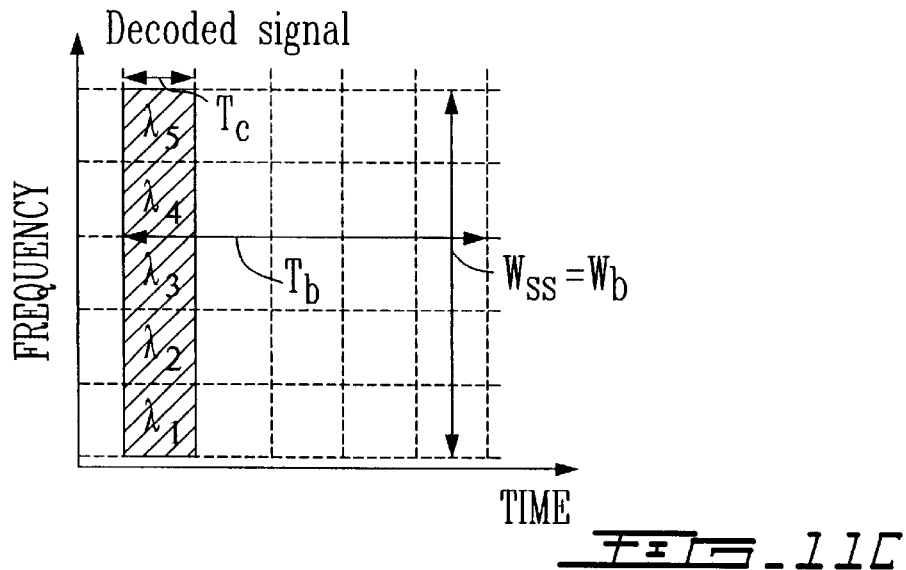
FIG_11C

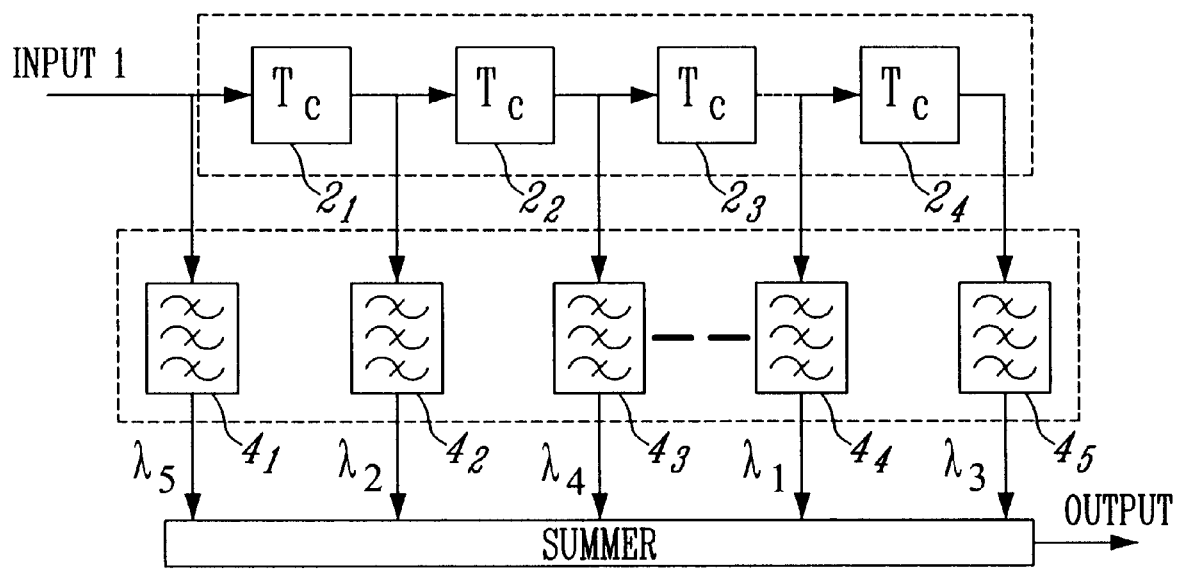
FIG_12A
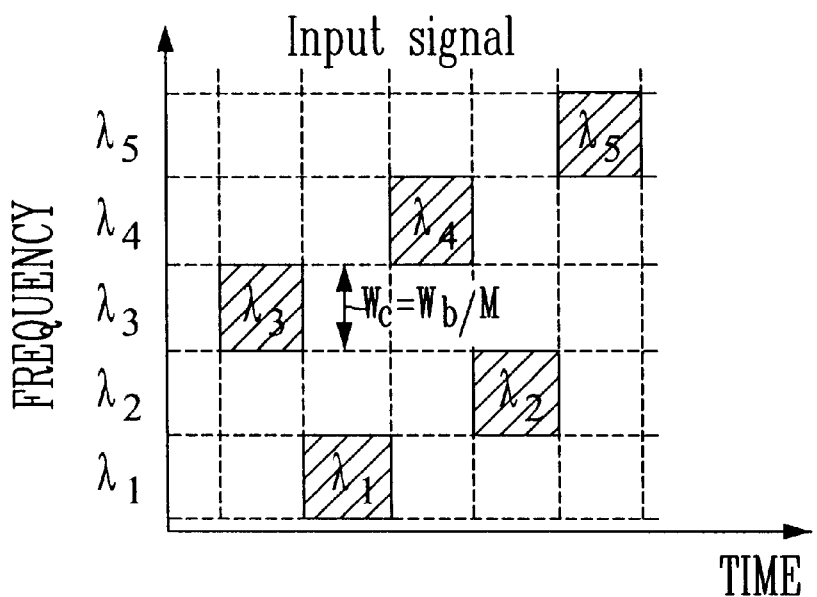
FIG_12B

LOW RATE USER

HIGH RATE USER

FIG_16

FIG_22

FIG_24

BANK OF DELAY ELEMENTS

US 6,381,053 B1

FAST FREQUENCY HOPPING SPREAD SPECTRUM FOR CODE DIVISION MULTIPLE ACCESS COMMUNICATION NETWORKS (FFH-CDMA)

FIELD OF THE INVENTION

The present invention relates to Fast Frequency Hopping Spread Spectrum (FFHSS) Code Division Multiple Access (CDMA) communications. More particularly, the invention relates to the transmission and reception signal processing methods and devices. The invented method avoids the requirement of fast frequency hopping synthesis in the FFHSS transmitter and receiver previously used In mobile radio communications or the like. Preferred embodiment of the invented method Is particularly suitable for fiber optical implementation of the FFHSS-CDMA technique.

BACKGROUND OF THE INVENTION

Code Division Multiple Access (CDMA) communications is a technique presently used in wireless applications. CDMA accommodates a large pool of subscribers, while providing dynamic simultaneous access to an arbitrary subset of them. In a typical CDMA network, a number of K users simultaneously communicate sharing the same communication medium. This is achieved by assigning a unique code to each individual user. The assigned codes are selected so as to minimize the interference or the cross-talk between users and to reduce the synchronization loop complexity in the receiver.

In the fields of satellite and mobile communications, spread spectrum (SS) signals served as a basis of the development of CDMA network systems. SS techniques are very popular in a wide variety of fields such as satellite communications, mobile communications, naval and avionics communication systems, distance or range measurement, high resolution target and direction finding systems. There are two categories of SS systems: direct sequence (DS) system, in which each information bit is multiplied by a temporal pseudo-random sequence, and a frequency hopping (FH) system, in which the carrier frequency of a narrow-band information transmitted signal is switched (or hopped) at a random and discrete method. Slow frequency hopping (SFH) means that only one frequency-hop is achieved per bit, however, fast frequency hopping (FFH) means that a number of frequency hops are achieved for every information bit.

The Prior Art FFHSS Transmission System

In a conventional FFHSS transmitter, as shown in FIG. 1, the data modulated signal is multiplied by the output of the frequency hopping synthesizer 104 using the first multiplier $102_1$. The frequency synthesizer 104 output signal is a wide band time periodic deterministic signal with time period equal to the duration of a one data bit modulated signal (Tb). In the following, it is assumed that only two kinds of information will be transmitted 1 and 0; FIG. 3A shows a sequence of four bits; 1010. Each bit period Tb is divided into an integer number (M) of time intervals Tc=Tb/M called chips. During every chip interval no more than one discrete frequency (or frequency band) from an available set of M frequencies (or frequency bands) is used in the frequency synthesizer 104 output signal. The M available frequencies are assigned to the M chip intervals as prescribed by the selected code from the code generator 1052 FIG. 3D shows an example where the integer M is equal to 5, hence the code is composed from 5 frequencies f1, f2, f3, f4 and f5. The order of frequencies In the selected code is f3, f1, f4, f2 and f5; which means that the frequency f3 is transmitted during the first chip interval, f1 is transmitted during the second chip interval, . . . , and the last frequency f5 is transmitted during the fifth chip interval. The modulation operation using the first multiplier $102_1$ spreads the data modulated signal energy over a bandwidth, called spread spectrum bandwidth Wss=M*Wb, which is M times larger than the data modulated signal bandwidth Wb. Hence, the FFHSS encoding operation cuts the modulated signal energy in time into M pieces, and shifts the frequency band of each piece by an amount corresponding to the FFH code. The frequency domain of the first multiplier $102_1$ output signal Is usually referred as the intermediate frequency. The second modulation, achieved using multiplier $102_2$, shifts all the SS signal to the carrier frequency fixed by the oscillator 103. The multiplier $102_2$ output signal is fed to the emitting or transmitting antenna 106.

Receiver System

In the conventional FFHSS receiver, as shown in FIG. 2, a receiving antenna 151 provides the received FFHSS signal. A local oscillator 153 generates a signal for shifting a frequency band of a received signal to a band of an intermediate frequency. A multiplier $152_1$ multiplies the received signal by the local oscillator 153 output signal for shifting the frequency band to the base band domain if the synchronization is well established between the received frequencies and the locally generated frequencies. The band pass filter (BPF) 161 limits the band of the output signal of the first multiplier $152_1$ to the SS bandwidth Wss=M*Wb. A hopping synthesizer 154 outputs an SS signal similar to the transmitter hopping synthesizer 104 corresponding to the selected FFH code. The second multiplier $152_2$ multiplies the BPF 161 output signal with the hopping synthesizer 154 output signal, the product inputs the low pass filter LPF 162 which limits the band of the output signal of the second multiplier $152_2$ to the original data modulated signal bandwidth Wb. A power measuring device 157 measures a detection power for a one bit portion from the low pass filter 162; on the basis of this power measurement, the hopping sequence phase control equipment 166 controls the hopping synthesizer via a code generator 155 to continuously shift its hopping sequence until full synchronization is established between the received signal hopping sequence and the locally generated hopping sequence. A decision circuit 158 receives the output of the low pass filter 162 and decides about the received output.

Illustrative Example

FIG. 3 illustrates the signal evolution through the various major signal processing steps in the prior art FFHSS transmitter and receiver. FIG. 3A depicts a sequence of 4 data bits (1010) in the logical state. FIG. 3B shows the data modulated signal at the first multiplier $102_1$ input. In FFHSS systems, frequency shift keying (FSK) and phase shift keying (PSK) are the most popular modulation techniques in mobile radio communications. Amplitude shift keying (ASK) is less robust in wireless communications. Since only two types of information are considered, 1 and 0, only the binary cases of the modulation schemes, (binary ASK, FSK and PSK), are considered. FIG. 3C shows the time (Tb) versus frequency bandwidth (Wb) allocated to the data modulated signal in the first multiplier $102_1$ input during each data bit. FIG. 3D shows the time (Tb) versus frequency bandwidth (Wss=5*Wb) allocated to the spread spectrum signal in the first multiplier $102_1$ output during each data bit. Each bit energy is distributed in 5 pieces, each of which is of Wb frequency bandwidth and TcT=b/5 chip time duration. The time and frequency distribution of the band pass filter (BPF) 161 output signal is similar to the time versus frequency bandwidth allocated to the spread spectrum signal in the first multiplier 102 output depicted by FIG. 3D in absence of multiple access interference. The time and frequency distribution (or occupancy) of the low pass filter (LPF) 162 output signal is depicted by FIG. 3E.

Discussion of Some Points

In prior art FFHSS techniques, the frequency synthesizer hopping rate is usually considered the major limitation. The FFH encoding/decoding stages require chip rate frequency hopping synthesizers which substantially increases the system cost. Before effective data transmission or reception, the frequency hopping synthesizer (FHS) output is determined (or fixed). During the transmission or reception process the FHS output is a deterministic signal. In the transmission system, only the data signal is random. In principle, only the data rate limits the transmitter minimum rate. However, code generation and frequency synthesizer work at the chip rate.

LAN Applications

Spread Spectrum (SS) systems usually require complex signal processing operations, especially in the encoding and decoding steps. In prior art FFH-CDMA, previously used for radio frequency communications, frequency synthesizers at the chip hopping rate are required. The frequency synthesizer hopping rate is usually considered as a major limitation of the system, and substantially increases the system cost. As a result, in Local Area Network (LAN) applications, FFHSS techniques have not been implemented to provide greater sharing of bandwidth among users connected to the LAN. However, there remains a need for providing higher bandwidth shared access to communications media, such as twisted-pair, coax and optical fibers, used in LANs and telecommunications networks.

In the past few years, several CDMA systems using all-optical signal processing systems, including encoders, decoders, power limiters and threshold comparators, have been proposed. Fundamental differences between the optical and the radio communication fields and instruments, such as sources, communication mediums and detection systems, led to the design of some new optical schemes with no parallels in radio COMA systems. Coherent ultra-short pulse sources have been proposed to spectral phase encoding CDMA, however, non coherent broadband sources such as Light Emitting Diodes (LED) and erbium-doped superfluorescent fiber source (SFS) have been proposed for spectral amplitude encoding COMA. These two techniques fall into the so-called frequency encoded (FE) CDMA and have no parallels in radio CDMA. These techniques inherently use very wide bandwidth in the channel, however, they are not considered as SS techniques because the spreading operation is not effectively achieved.

For local area networks with a bit rate on the order of Gigabits per second, optical frequency synthesizers with a chip hopping rate on the order of a tenth of a Gigabit per second are required for optical implementation of the FFH-CDMA technique. However, a practical optical frequency synthesizer has a very limited hopping rate. Slow frequency hopping CDMA (SFH, i.e. one frequency-hop per data bit); and very slow frequency hopping CDMA(one hop per packet of bits) have been previously proposed for optical inter-satellite CDMA communications. The bit rate was limited to a few tenths of Megabits/sec. Furthermore, for local area networks with a bit rate on the order of Gigabits per second, an optical frequency synthesizer with a chip hopping rate on the order of a tenth of Gigabits per second is required for optical implementation of the FFH-CDMA technique.

SUMMARY OF THE INVENTION

It is an object of the present invention to provide an FFHSS technique that can be performed with all-optical devices for faster operation than electronic processing methods.

It is another object of the present invention to reduce the processing rate in the transmitter and the receiver. This especially allows fiber optical implementation of the FFHSS technique.

According to a further object of the invention, the processing rate in all of the transmitter and the receiver parts can reduced to the data bit rate, thus avoiding the chip rate frequency hopping synthesis.

An object of the present invention is to provide an FFHSS-CDMA communication system which exploits some deterministic aspects in the signal processing operations to avoid the utilization of real-time chip rate frequency hopping synthesis of the spread spectrum signal in the transmission and in the reception ends. According to the present invention, since the frequency synthesizer output signal is a deterministic periodic signal, passive or lower rate devices can be used in the encoding and decoding stages to avoid real time chip rate frequency hopping synthesis.

Another object of the present invention is to provide a transmitter in a FFHSS communications system which avoids the real time chip rate frequency hopping synthesis.

Another object of the present invention is to provide a receiver in a FFHSS communications which avoids the real time chip rate frequency hopping synthesis.

Another object of the present invention is to provide an embodiment for optical FFHSS system in CDMA local area network architecture.

Yet another object of the present invention is to provide an embodiment for mobile radio frequency FFHSS system which does not require a frequency hopping synthesizer.

According to a first broad aspect of the present invention, there is provided a method of optical signal transmission comprising the steps of generating a multi-wavelength optical signal modulated to encode data and occupy a predetermined fraction of a bit time slot, selecting a plurality of wavelength division slots within a wavelength range of the multiwave-length signal, introducing, according to a code, a predetermined time delay in spectral components of the multi-wavelength optical signal corresponding to each of the plurality of wavelength division slots to displace the spectral components within the bit time slot; and feeding the spectral components delayed according to the code into a waveguide transmission medium shared by at least one other transmitter using the wavelength division slots and a different code.

Preferably, the step of introducing the predetermined time delay may comprise providing an in-waveguide Bragg grating device having a plurality of spaced Bragg grating reflectors for reflecting the spectral component time delayed according to the code. Also preferably, the step of introducing may further comprise providing an optical circulator, coupling the optical signal to a first port of the circulator, coupling the in-waveguide Bragg grating device to a second port of the circulator, and coupling a third port of the circulator to the waveguide transmission medium. The in-waveguide Bragg grating device may comprise an in-fiber Bragg grating, and may also be programmable. The programmable Bragg grating may be adjusted using tensioning devices, such as piezoelectric devices, or using temperature control devices.

Preferably, the code may utilize fewer than all of the wavelength division slots and a bit time slot shorter than a bit time slot used when all of the wavelength division slot is utilized, whereby a shorter code length may be used to achieve a higher bit rate.

According to another broad aspect of the invention, there is provided a method of optical communication comprising the steps of generating a multi-wavelength optical signal modulated to encode data and occupy a predetermined fraction of a bit time slot at a transmitter end; selecting a plurality of wavelength division slots within a wavelength range of the multi-wavelength signal; introducing, according to a code, a predetermined time delay in spectral components of the multi-wavelength optical signal corresponding to each of the plurality of wavelength division slots to displace the spectral components within the bit time slot; feeding the spectral components delayed according to the code into a waveguide transmission medium shared by at least one other transmitter using the wavelength division slots and a different code; receiving the optical signal from the transmission medium; and detecting the displaced spectral components according to the code to recover the data.

Preferably, the step of detecting may comprise: introducing, according to a reverse code complementary to the code, a predetermined time delay in spectral components of the multi-wavelength optical signal corresponding to each of the plurality of wavelength division slots to displace the spectral components within the bit time slot; and detecting only within the predetermined fraction of the bit time slot signal energy of the received optical signal.

Also preferably, the step of receiving may comprise compensating for chromatic dispersion caused by the transmission medium.

When the transmitter end is subject to temperature variations affecting a wavelength of the spectral components, the step of detecting may comprise providing a programmable in-waveguide Bragg grating device having a plurality of tunable spaced Bragg grating reflectors for reflecting the spectral component time delayed according to the code, and tuning the Bragg grating reflectors to compensate for the temperature variations. The tuning of the Bragg grating reflectors may comprise adjusting a temperature control of a temperature control device for each of the Bragg grating reflectors. The tuning of the Bragg grating reflectors may comprise adjusting a voltage control of a piezoelectric element for each of the Bragg grating reflectors.

According to another preferred feature, the code utilizes fewer than all of the wavelength division slots and a bit time slot shorter than a bit time slot used when all of the wavelength division slot is utilized, whereby a shorter code length may be used to achieve a higher bit rate, the step of detecting including steps of: detecting any signal present in at least one unused ones of the wavelength division slots at predetermined time delays; and subtracting the signal detected in the previous step from the displaced spectral components according to the code in order to recover the data.

The invention also provides a method of fast frequency hopping spread spectrum communication comprising the steps of: generating a multi-frequency source signal occupying a wide frequency band; modulating the source signal to encode data and occupy a predetermined fraction of a bit time slot at a transmitter end; selecting a plurality of frequency division slots within the wide frequency band; introducing, according to a code, a predetermined time delay in spectral components of the modulated source signal corresponding to each of the plurality of frequency division slots to displace the spectral components within the bit time slot; transmitting the spectral components delayed according to the code over a medium shared by at least one other transmitter using the wavelength division slots and a different code; receiving the transmitted spectral component from the transmission medium; and detecting the temporally displaced spectral components according to the code to recover the data.

The preferred embodiment of is invention uses band-pass filtering tools and is particularly suitable for optical FFHSS system. In the transmitter, the information bit sequence modulates a broadband source so that the energy assigned to a data bit is concentrated on just a short interval from the bit period (Tb), This interval is in principle less than or equal to Tb/M. In the remaining interval of time, no energy is transmitted. The modulation technique can be frequency shift keying (FSK), phase shift keying (PSK), amplitude shift keying (ASK) or the like. The data modulated signal enters to an equipment which simultaneously or sequentially performs the following three functions generating a signal in an FFHSS form. The first function is a spectral slicing of the input signal leading to a number of sub-pulses, each of which is supported by one different frequency Interval. The second function is a sub-pulse modulation. This modulation can be In ASK, PSK or the like, as prescribed by the code. The third function is a sub-pulse delaying, where each sub-pulse is differently delayed as prescribed by the code frequency hop pattern. The order of these functions depends on the used devices. Some optical devices are proposed in the following description to simultaneously perform the three functions. The final output signal is composed from M sub-pulses, each of which is supported by different frequency bandwidth and positioned in time as prescribed by the code frequency hopping pattern. In the receiver, the received signal is fed to an equipment configured to receive an intended desired user signal. The equipment performs simultaneously or sequentially three functions. The first function (spectral slicing) is similar to that in the transmitter. The second function is the sub-pulse demodulation and depends on the used modulation technique in the transmitter. The third function is also a sub-pulse delaying using the reverse order than the transmitter.

BRIEF DESCRIPTION OF THE DRAWINGS

The invention will be better understood by way of the following detailed description of a preferred embodiment and other embodiments with reference to the appended drawings, in which:

FIG. 6 shows a simple example to illustrate the signal waveform evolution through the transmitter and receiver according to the preferred embodiment.

FIG. 7 is a block diagram of the encoding module according to the preferred embodiment.

FIG. 8 is a block diagram of the decoding module according to the preferred embodiment.

FIG. 11A is a schematic diagram of the optical receiver and decoding device using in-fiber Bragg gratings according to the preferred embodiment.

FIG. 11B is a graph of the input signal prior to decoding.

FIG. 11C is a graph of the output signal after decoding.

FIG. 12A is a schematic diagram of an RF decoding device according to an alternative embodiment.

FIG. 12B is a graph of the input RF signal prior to decoding.

DETAILED DESCRIPTION OF THE PREFERRED EMBODIMENT

Figure 4:
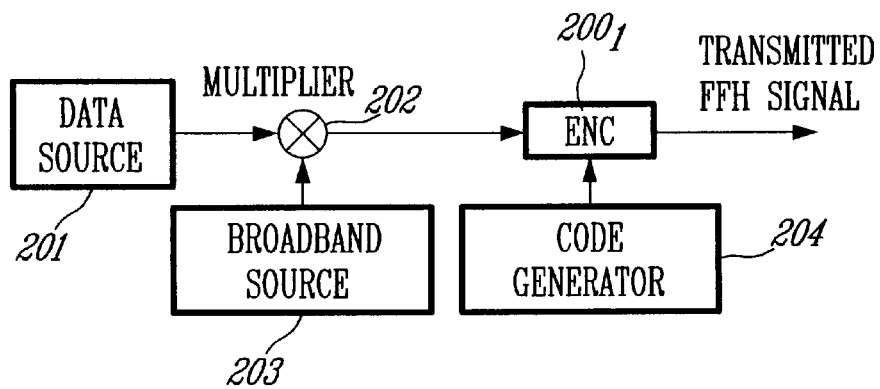
FIG. 4 is a block diagram of an FFHSS, transmitter according to the preferred embodiment.

At the transmission end, as shown in FIG. 4, the data source 201 output signal is multiplied by a broadband source 203 output signal using the multiplier 202 leading to wideband data modulated signal. According to the present invention, the data modulated signal occupies exactly the spread spectrum bandwidth before the FFH encoding operation and conserves the same bandwidth in the channel. The data modulated signal is fed into the encoding device ENC $200_1$ which is controlled by a code generator 204 and performs the encoding operation without changing the signal bandwidth. The output signal of ENC $200_1$ is transmitted to the channel. The principle and the role of the code generator 204 in this invention differ from the principle and the role of the code generator 105 in the prior art. In this invention, the rate of code generator has no relation with the data bit rate. The code generator in this invention is activated only to configure the ENC $200_1$ before the data transmission initiates.

Figure 3:
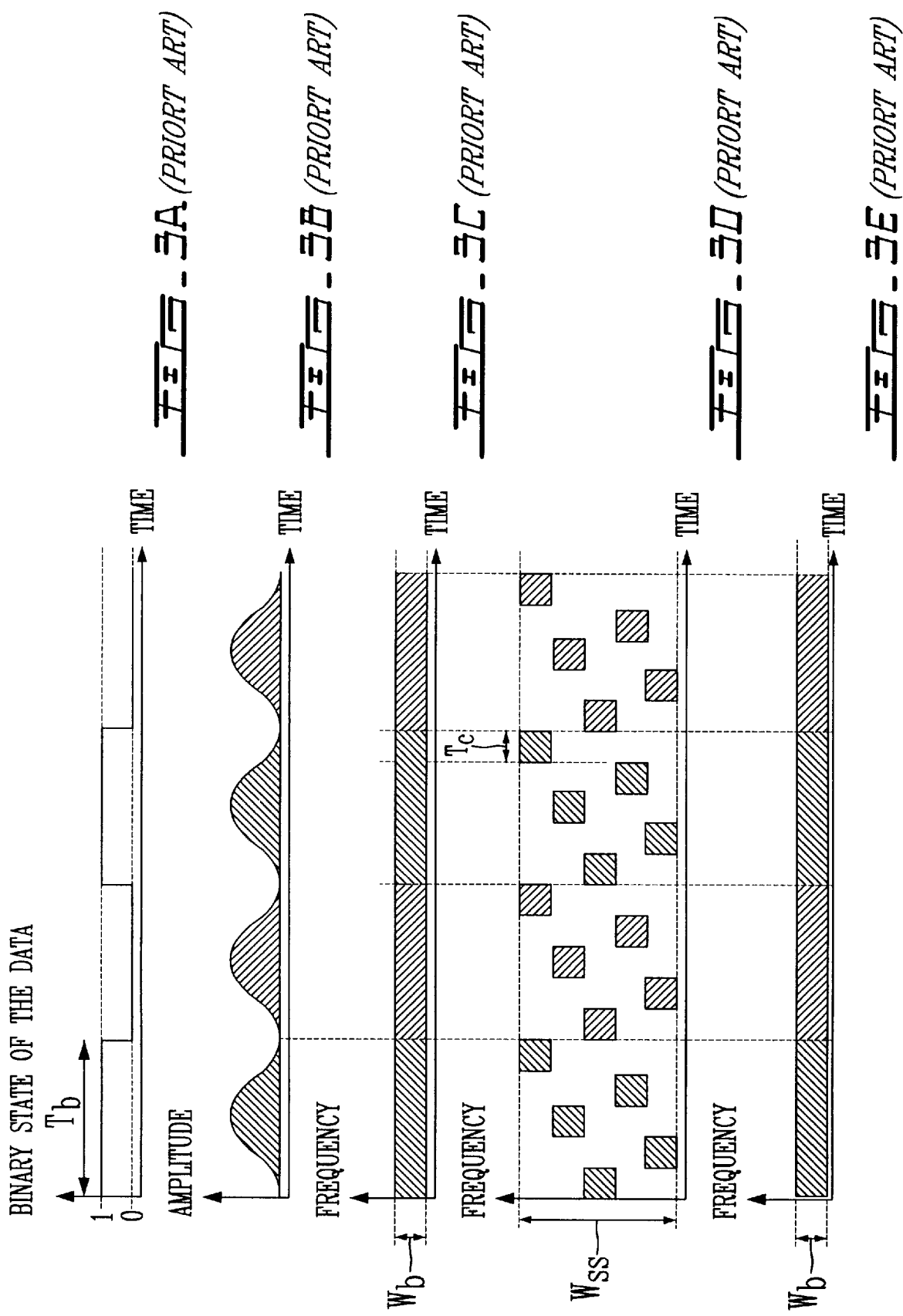
FIG. 3 shows a simple example to illustrate the signal waveform evolution through the Prior Art conventional transmitter and receiver systems.

FIG. 6 shows an example when the number of frequencies used for encoding is M=5 and FFH code is similar to that in FIG. 3D. As shown in FIG. 6A, the energy assigned to each data bit in the data modulated signal (multiplier 202 output signal) is concentrated in the first chip interval, however it occupies a wide frequency band (Wb=Wss). In the remaining time of the bit period Tb no power is transmitted. This power distribution in time can be practically performed using different processing methods: the data source output signal waveforms shaping, the broadband source output signal shaping or by the multiplier 202 operation controlling or the like.

Figure 1:
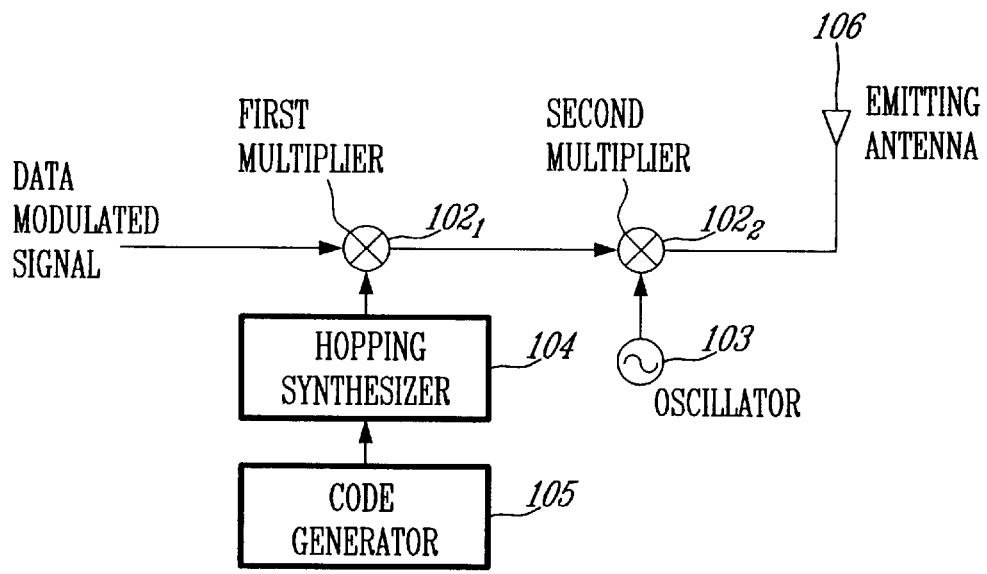
FIG. 1 is a block diagram of a Prior Art conventional FFHSS transmitter.
Figure 2:
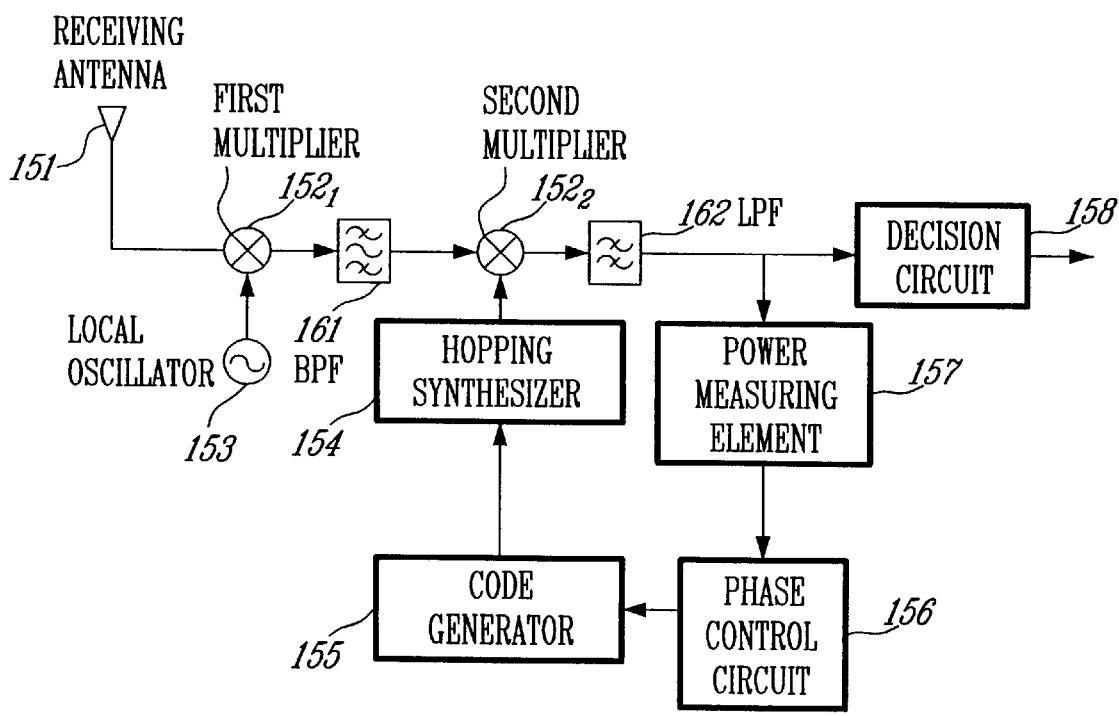
FIG. 2 is a block diagram of a Prior Art conventional FFHSS receiver.

The ENC $200_1$ has one information signal input (INPUT 1 in FIG. 7), one control signal input (INPUT 2 in FIG. 7) and one FFHSS encoded signal output (OUTPUT in FIG. 7). The multiplier 202 output signal in a one pulse per bit for Tc=Tb/M duration and Wb=Wss frequency bandwidth. The ENC $200_1$ simultaneously or sequentially performs three functions: 1) spectral slicing of the input signal into chip pulses, 2) a chip-pulse modulation and 3) a chip-pulse delaying. The output is an FFHSS signal composed from M sub-pulses (or chip-pulses), each of which is centered at different frequency and ordered in time as fixed by the FFH code. The ENC $200_1$ output signal has an FFHSS nature similar to the signal generated at the second multiplier $102_2$ output in the prior art depicted by FIG. 1. Several practical solutions are disclosed herein for the passive encoding operation achieved using the ENC $200_1$, especially suitable for an optical implementation of the FFHSS-CDMA technique.

Figure 5:
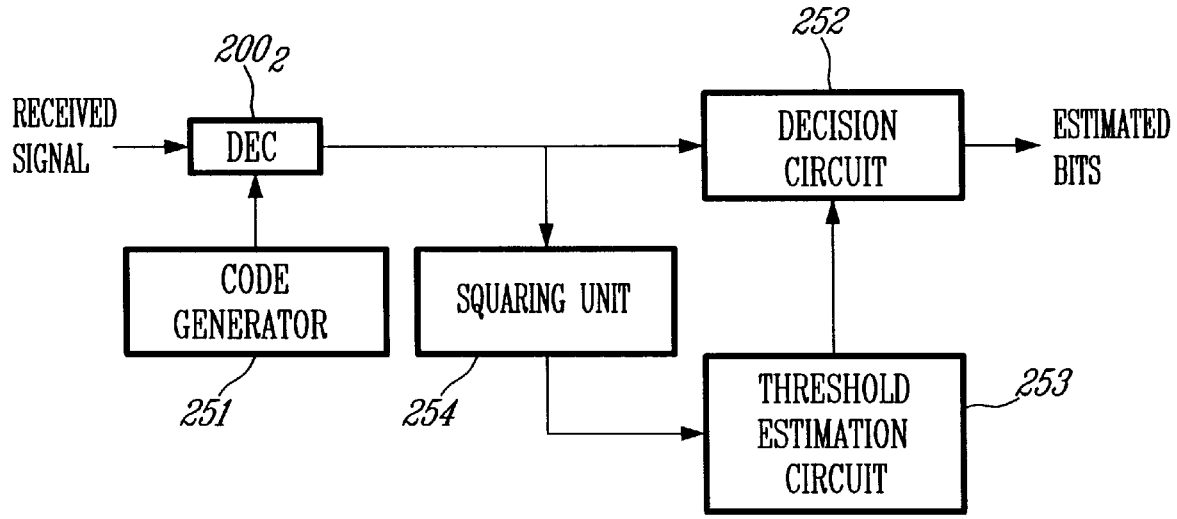
FIG. 5 is a block diagram of an FFHSS receiver according to the preferred embodiment.

According to the present invention, as shown in FIG. 5, the FFHSS signal enters a passive decoding device DEC $200_2$ through the first input (INPUT 1 in FIG. 8). The code generator 251 configures the DEC $200_2$ to perform the decoding operation. Similarly to the ENC $200_1$, the DEC $200_2$ simultaneously or sequentially performs three functions: 1) spectral slicing of the Input signal into chip pulses, 2) a chip-pulse demodulation and 3) a chip-pulse delaying. This means that DEC $200_2$ firstly subdivides the received FFHSS signal into a chip frequency sub-bands, secondly demodulates the chip sequence and finally delays (or shifts in time) each chip pulse by an amount corresponding to the order prescribed by the code generator 251, which is the reverse order as in the encoder. The cumulative delay for each chip pulse through the DEC $200_1$ in the transmitter and DEC $200_2$ in the receiver is equal to M*Tc=Tb. In the DEC $200_2$ output signal, the chip pulses overlap In time leading to a high level signal. The energy of the DEC $200_2$ output signal is concentrated in one chip interval, however, it conserves its wide frequency band Wss=Wb. The squaring unit 254 squares the DEC $200_2$ output signal, the output of which is used by the threshold estimation circuit 253. The threshold estimate is used in the decision circuit 252 to decide about the received bit value.

FIG. 6 illustrates the signal evolution through the various major signal processing steps in the FFHSS transmitter and receiver according to the preferred embodiment. FIG. 6A depicts a sequence of 4 data bits (1010) in the logical state. FIG. 6B shows the data modulated signal at the multiplier 202 output. FIG. 6C shows the time (Tc) versus frequency bandwidth (Wb=Wss) allocated to the data modulated signal in the multiplier 202 output during each data bit. FIG. 6D shows the time (5*Tc=Tb) versus frequency bandwidth (Wss=Wb) allocated to the spread spectrum signal in the ENC $200_1$ output during each data bit. Each bit energy is distributed in 5 pieces, each of which is of Wc=Wb/5 frequency bandwidth and TC=Tb/5 chip time duration. The time and frequency distribution of the DEC $200_2$ input signal is similar to the depicted by FIG. 6D in absence of multiple access interference. The time and frequency distribution (or occupancy) of the DEC $200_2$ output signal is depicted by FIG. 6E.

For optical communications, a set of in-line fiber Bragg gratings (FIG. 9A) performs the functions of ENC $200_1$ for binary ASK chip modulation. The Bragg gratings slice the spectrum into frequency bins. Each Bragg grating has a slightly different corrugation period so that the spectrum of the light reflected back from each grating is centered on the frequency associated with that grating and has the shape of the reflection function of that grating. Due to the "first in line, first reflected" nature of multiple Bragg gratings, the time frequency hopping pattern is determined by the order of the grating frequencies in the fiber. Physical spatial separation between gratings determines the temporal separation between the reflected pulses (chip duration).

Figure 9A:
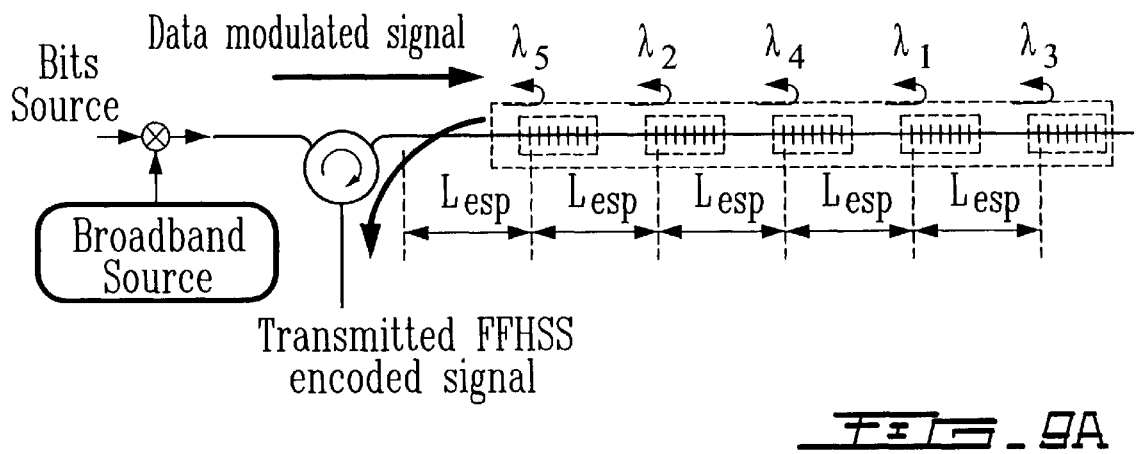
FIG. 9A is a schematic diagram of the optical transmitter and encoding device using in-fiber Bragg gratings according to the preferred embodiment.
Figure 9B:
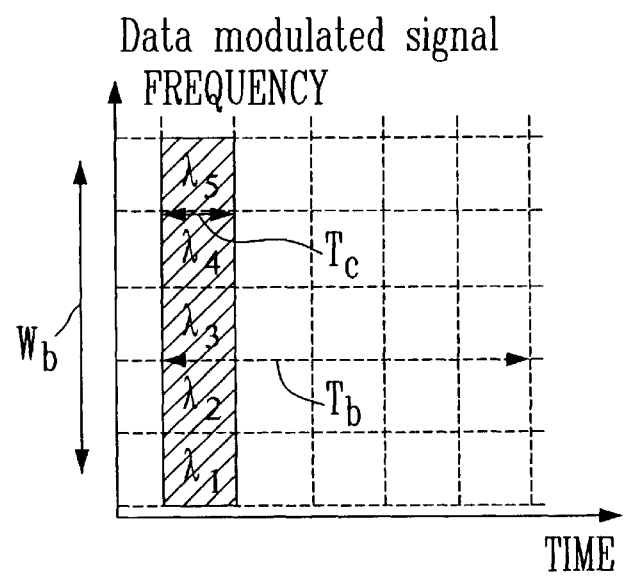
FIG. 9B is a graph of the input signal prior to encoding.
Figure 9C:
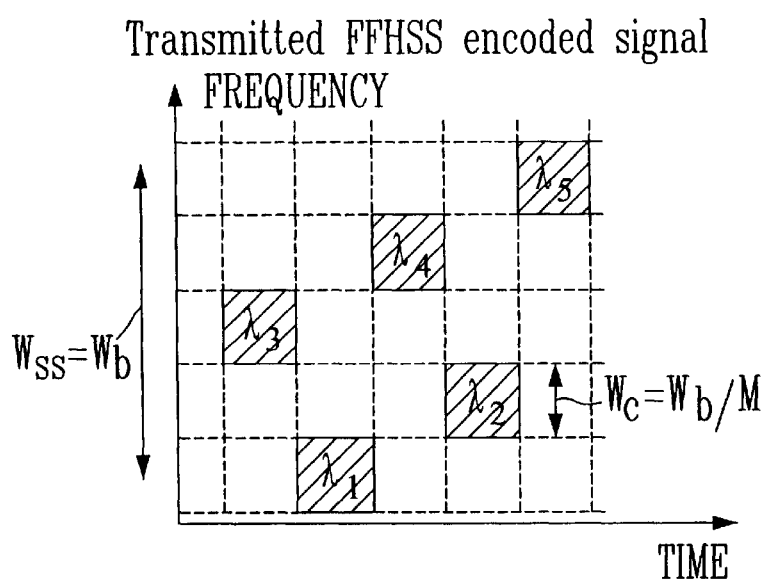
FIG. 9C is a graph of the output signal after encoding.

Using a broadband source, a series of Bragg gratings as encoding device ENC $200_1$ and a circulator as adder, FIG. 9A shows an optical frequency-hop transmitter. The coded signal will be a series of time pulses, each with a distinct slice of the spectrum. This signal is sent to the optical network and combined with other FFH-CDMA signals generated with other codes.

Figure 11D:
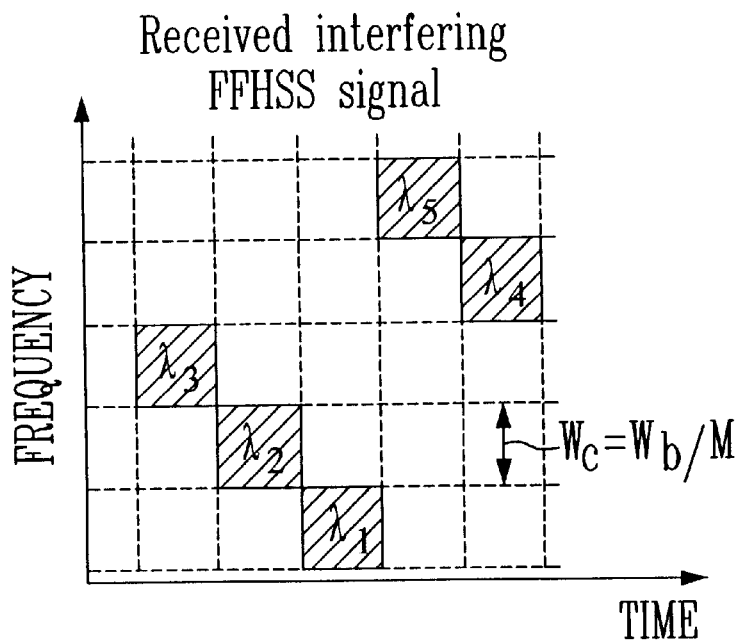
FIG. 11D is a graph of a received interfering FFHSS signal.
Figure 11E:
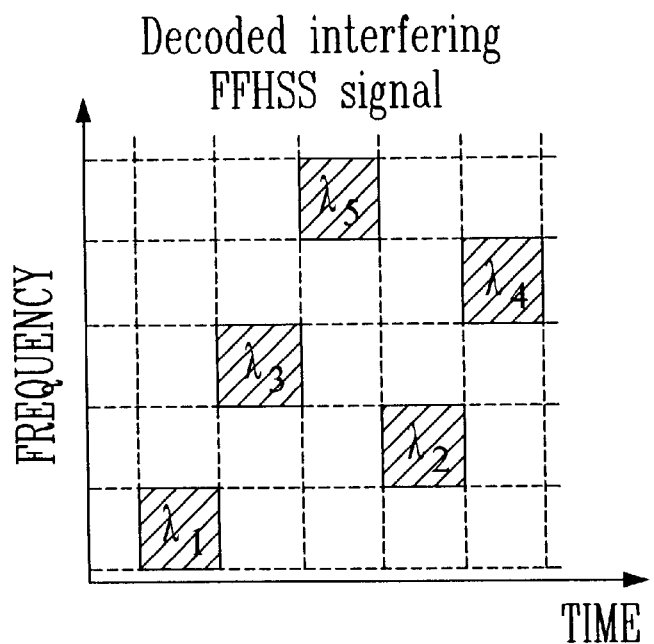
FIG. 11E is a graph of the decoded interfering FFHSS signal.

Similarly to ENC $200_1$, a set of in-line fiber is Bragg gratings performs the functions of DEC $200_2$ for binary ASK chip demodulation, as shown in FIG. 11. The order of the gratings in the decoding device is inverted with respect to the encoder. Due to the "first in line, first reflected" nature of multiple Bragg gratings, the chip pulses are synchronized in the output signal.

Each Bragg grating reflects a frequency bin with a time delay proportional to that grating's position in the fiber. Therefore each frequency slice must have the corresponding delay to decode into the original data pulse. The portion of the received signal corresponding to the desired user will have its series of time pulses recombined into a single peak with all spectral slices contributing. The interfering signals will not be decoded since 1) their spectral components may be different, and 2) their time order of frequencies will certainly be different.

It will be appreciated that the code could utilize fewer than all of the wavelength division slots, and the decoder could be configured to detect any signal present in the unused ones of the wavelength division slots. By subtracting the signal detected in the unused slots from the sum signal of the detection of signal in the used slots, the resulting detection of a coded bit is obtained. The person skilled in the art will recognize that such subtraction of signal from unused slots may result in an improved SNR in certain circumstances.

In the RF field, the FFHSS prior art is very popular and the implementation techniques are well developed. These techniques usually use PSK or FSK chip and bit modulation, but not ASK modulation, and they provide high performance. This invention can be very useful for systems that require high simplicity even at the sacrifice of some performance or capacity. Conventional electronic components such as time delay lines and electrical band pass filters, as described by FIG. 10A, can perform all the ENC $200_1$ functions in RF. A simple broadband source, such as preamplified thermal noise source, can be modulated by the data bits generating short (in time) and wide (in frequency) pulses as shown by FIG. 10B and fed into the first delay element $2_1$ and the first band-pass filter $4_1$. The band-pass filter $4_1$ output is a pulse centered at the frequency selected by the $4_1$ filter. A second copy (or part) of the data modulated signal (INPUT 1) will be fed into the band-pass filter $4_2$ which outputs a pulse centered at the second frequency prescribed by the code and feeds it to the adder, The other filter delay elements $2_2 \ldots 2_4$ and the filters $4_3 \ldots 4_5$ operate in a same manner. If the band-pass filter frequencies are well selected and the delaying operations are accurately performed as prescribed by an FFH code, the system of FIG. 10A can successfully perform the FFHSS encoding operation. FIG. 10C shows the output of the encoding device for the FFH code $\lambda_{-3}$, $\lambda_{-1}$, $\lambda_{-4}$, $\lambda_{-2}$, and $\lambda_{-5}$; which corresponds simultaneously to the filters $4_1 \ldots 4_5$ frequency bands.

Figure 10A:
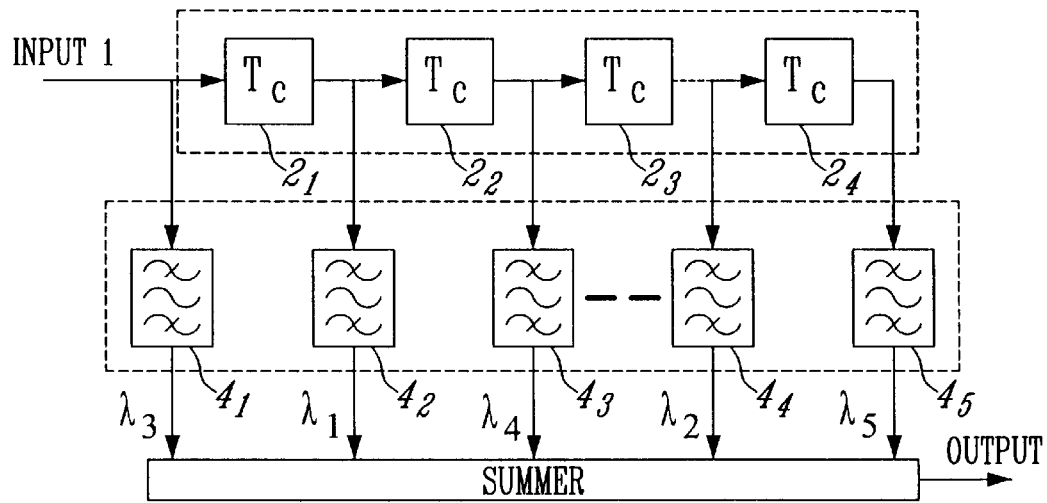
FIG. 10A is a schematic diagram of an RF encoding device according to an alternative embodiment.
Figure 10B:
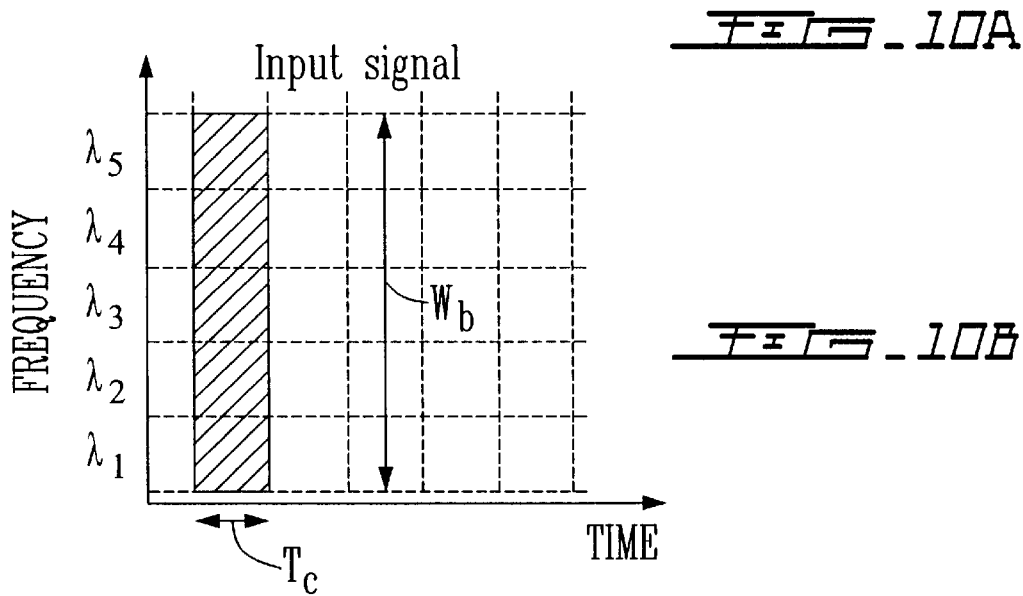
FIG. 10B is a graph of the input RF signal prior to encoding.
Figure 10C:
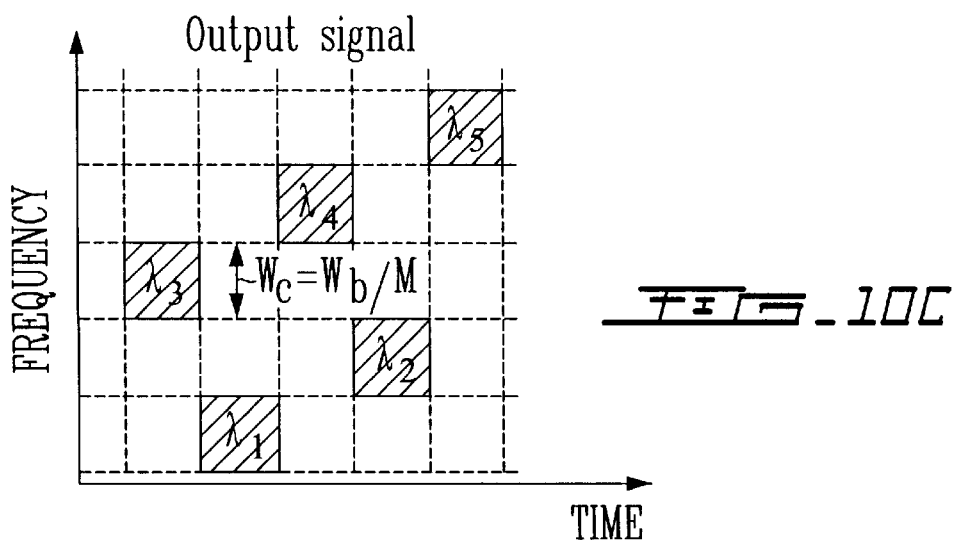
FIG. 10C is a graph of the RF output signal after encoding.
Figure 12C:
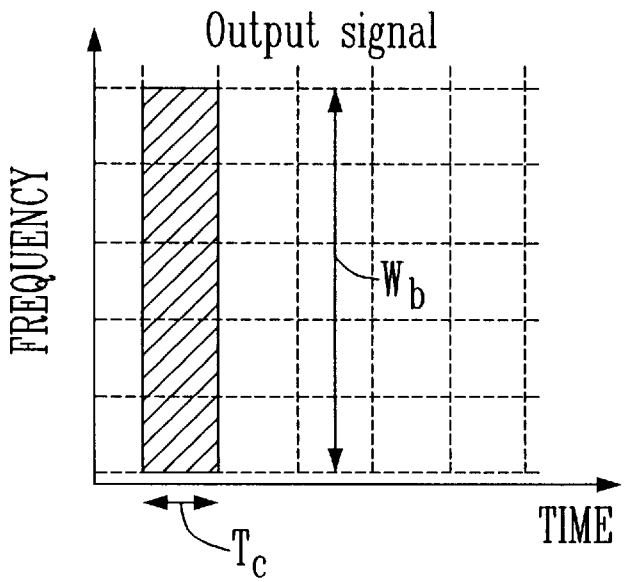
FIG. 12C is a graph of the RF output signal after decoding.

FIG. 12A shows a scheme identical to that of FIG. 10A; however the center frequencies of the filters $4_1 \ldots 4_5$ have the reverse order $\lambda_{-5}$, $\lambda_{-2}$, $\lambda_{-4}$, $\lambda_{-1}$ and $\lambda_{-3}$ for correcting the relative delay time between the desired code pulses (FIG. 10B) leading to the superposition of their pulses as shown by FIG. 10C. The pulses resulting from an interferer do not superpose since the relative delays between its pulses are simply changed but not corrected.

Figure 13A:
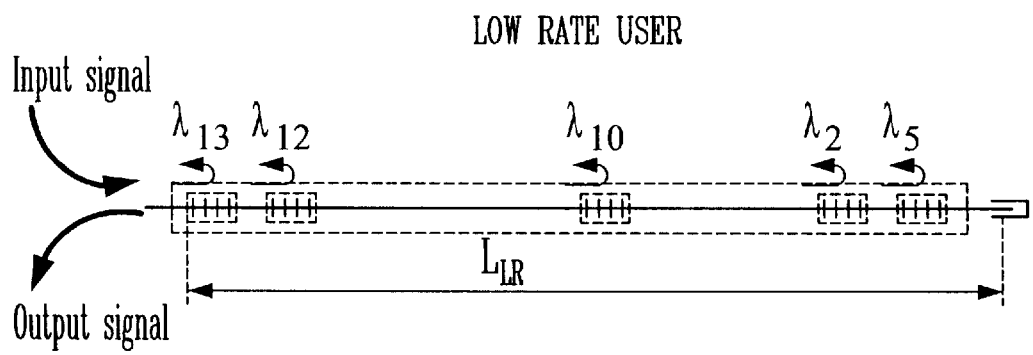
FIG. 13A is a schematic diagram of an encoder for a low bit rate user.
Figure 13B:
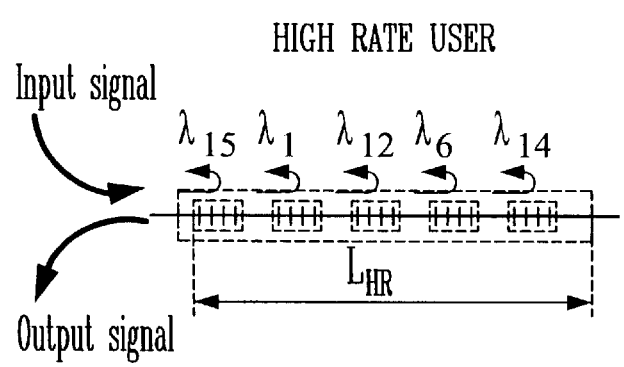
FIG. 13B is a schematic diagram of an encoder for a high bit rate user.
Figure 13C:
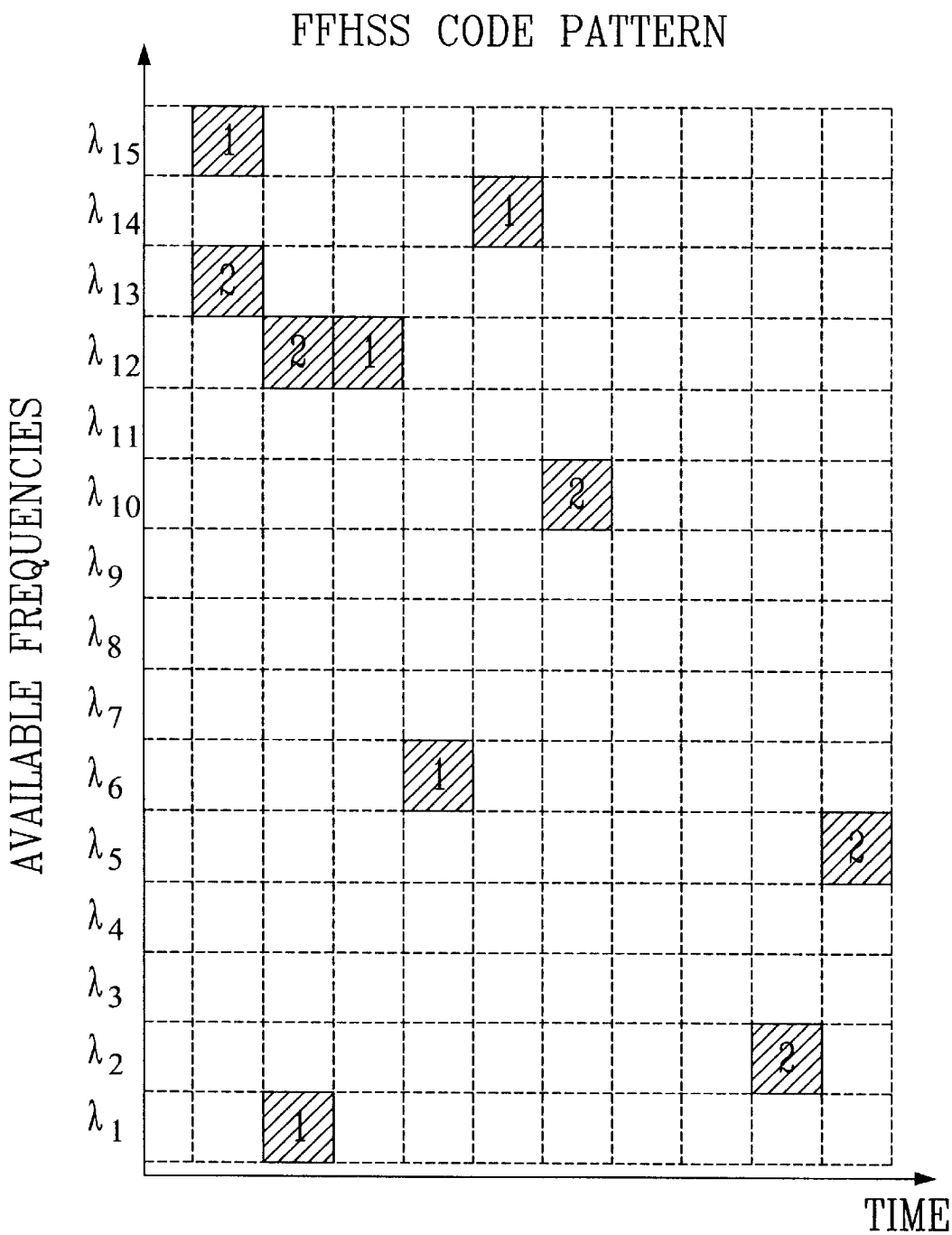
FIG. 13C is a graph showing the FFHSS code pattern for a both a low bit rate user and a high bit rate user.

Since in the present invention physical distance in fiber is used to perform the in-time encoding or pulse positioning, the length of the encoder depends on the required data bit rate in the system (and vice versa). For example, to achieve 500 Mbits/s data bit rate, all gratings may be placed in a space of about 20 cm, taking into account the in-fiber light velocity. To communicate with higher bit rates, a user should place the gratings in a shorter calculated fiber length, i.e. to compress the code. FIG. 13A illustrates a low rate user encoder which places its gratings (5 in the shown example) along its encoding fiber of length $L_{LR}$. In FIG. 13B, a different user places the same number of gratings (5 in the shown example) in a fiber of length $L_{HR}$. The user of FIG. 13A and the user FIG. 13B can share the same communications medium provided that their FFH codes are well selected to minimize the interference between them. FIG. 13C shows simultaneously the frequency hopping patterns for the low and high rate users.

Figure 14:
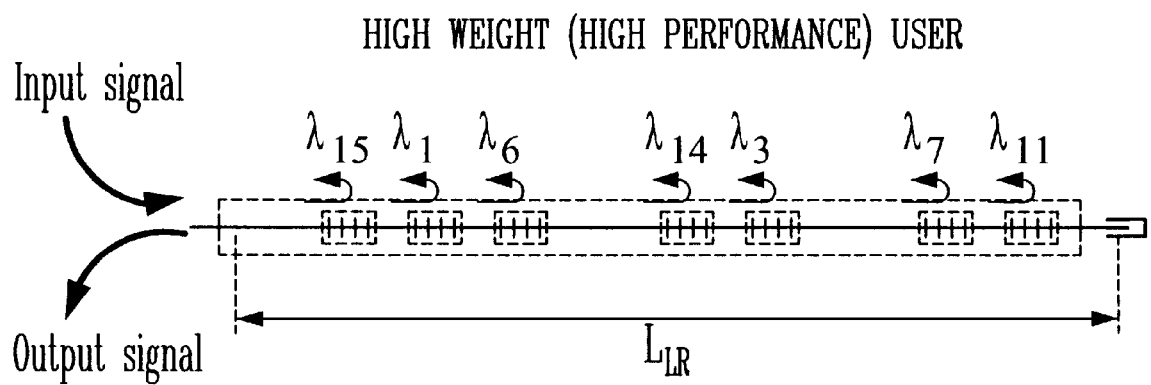
FIG. 14 is a schematic diagram of an encoder for a high performance user.
Figure 15:
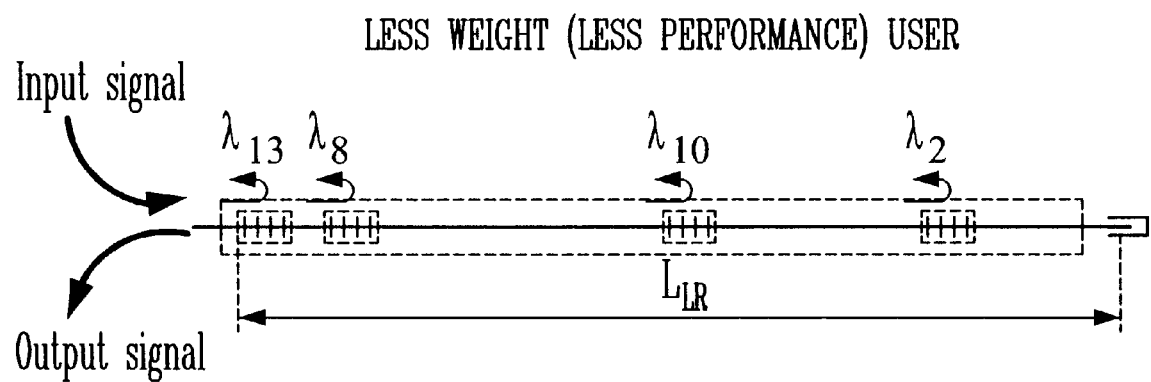
FIG. 15 is a schematic diagram of an encoder for a low performance user.
Figure 16:
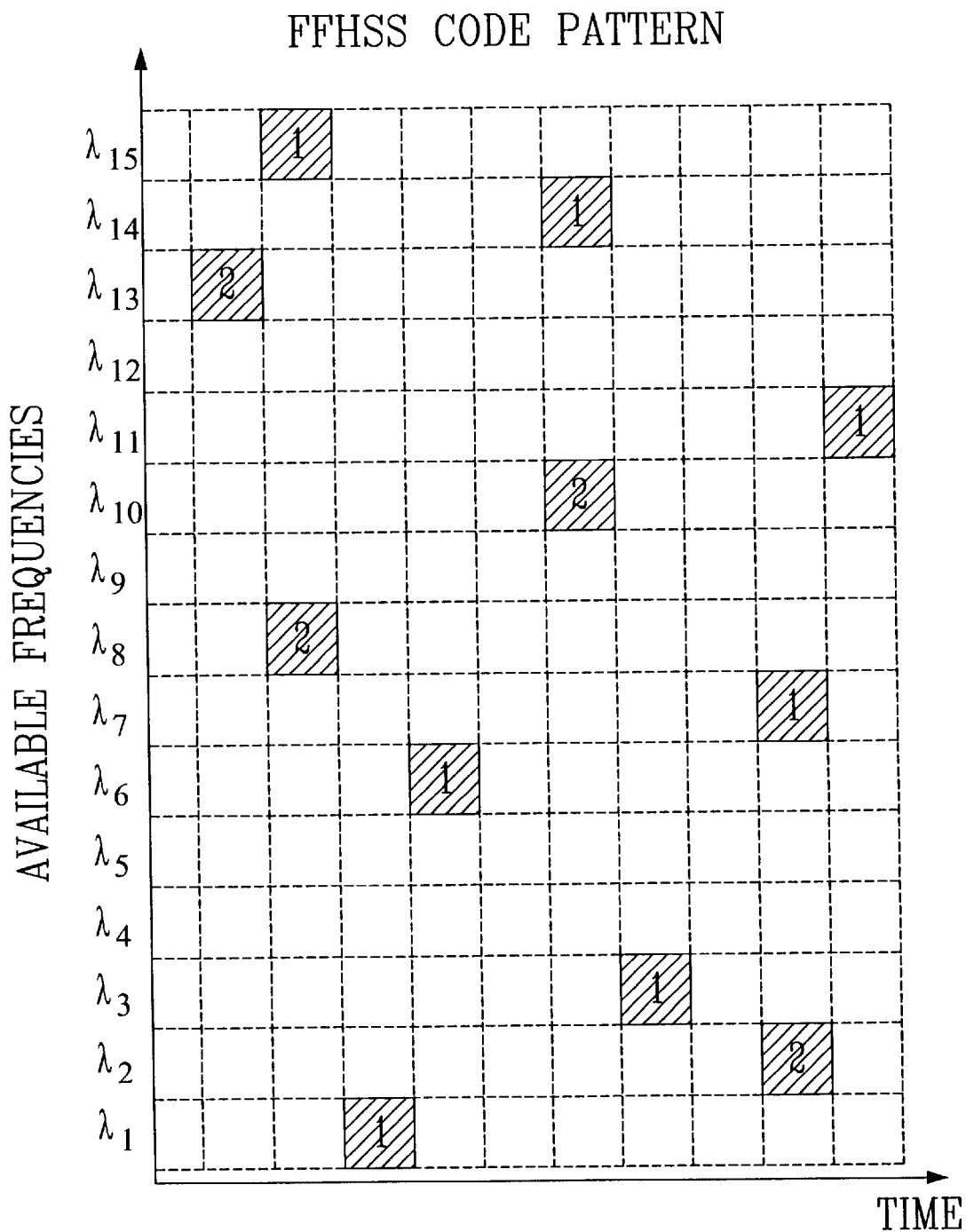
FIG. 16 is a graph showing the FFHSS code pattern for both a low performance user and a high performance user and a high performance user.

The number of 1's in every optical CDMA code represents the power or what is commonly called the "weight" of the code. The higher the number of 1's in a user code, the higher is its signal-to-noise ratio, and hence the higher is its performance. Higher performance can mean a lower probability of error and/or better security of the data. FIG. 14 illustrates a high performance user encoder, which uses 7 gratings, i.e. has 7 ones in its code. However, FIG. 15 illustrates a low performance user encoder, which uses only 4 gratings, i.e. has only 4 ones in its code. FIG. 16 shows simultaneously the frequency hopping codes of one high and one low performance users, respectively corresponding to FIG. 14 and FIG. 15. The FFH codes should be adequately selected to minimize the interference between them.

It will be appreciated that when the code utilizes fewer than all of the wavelength division slots, the decoder could be configured to detect any signal present in at least one unused ones of the wavelength slots division, and to subtract the signal detected in the unused slots from the sum signal of the detection of signal in the used slots. The person skilled in the art will recognize that such subtraction of signal from unused slots may result in an improved SNR in certain circumstances.

Figure 17:
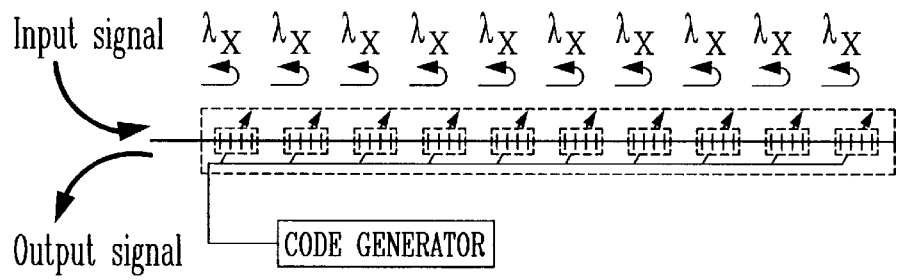
FIG. 17 is a schematic diagram of a programmable optical encoder/decoder device.
Figure 18:
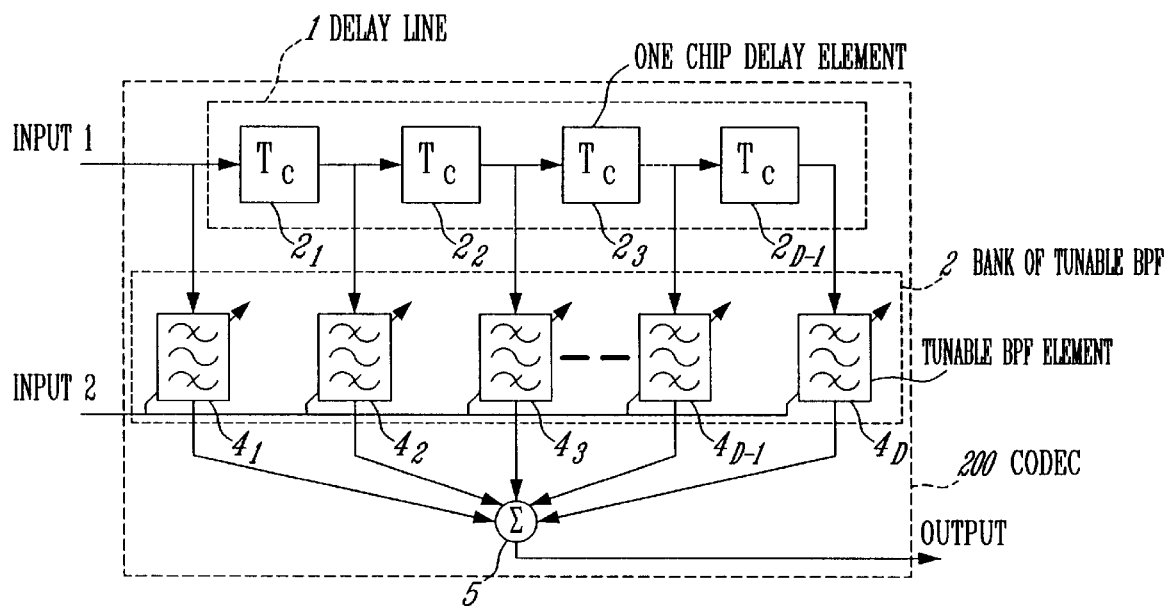
FIG. 18 is a schematic diagram of a programmable RF encoder/decoder device.
Figure 19:
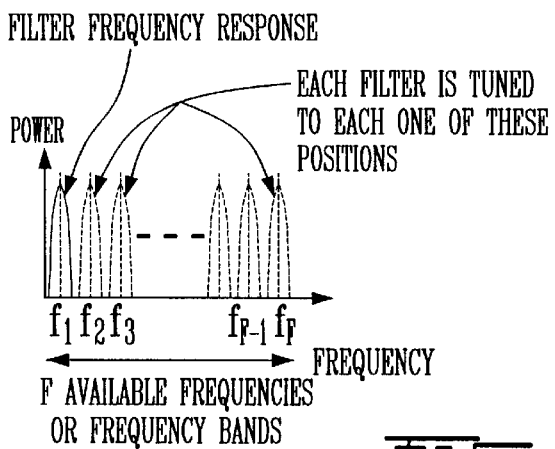
FIG. 19 is a graph of power versus frequency bands.

FIG. 17 shows that each grating can be tuned inside an available bandwidth so that its reflectivity can be switched from a given value to another as prescribed by the code. FIG. 18 illustrates a corresponding radio frequency implementation of the encoding/decoding device where a bank of adjustable band pass filters, a delay line and a summation element is used. FIG. 19 illustrates the useful frequency slices available from a broadband source spectrum (RF or optical), or can be interpreted as the output of a comb laser (or multi-wavelength laser). Each adjustable BPF (Bragg grating in the case of an optical source) can select any of these frequency slices as prescribed by the code.

By use of piezo-electric devices, the order of the center frequencies of the Bragg gratings can be changed, effectively changing the hop pattern and therefore allowing for programmable codes. The ability to reconfigure the encoder/decoder pair is essential for the modularity, survivability and the resilience of the network topology. To that end, several approaches can allow reconfiguration of the encoding/decoding device. In the preferred embodiment, the period of each Bragg grating is tuned so that the reflection spectrum of the grating moves within the available bandwidth, effectively changing its resonance wavelength. Therefore, while each grating can be designed to have a common center frequency, it can later be tuned to a particular frequency as prescribed by the code.

Figure 20:
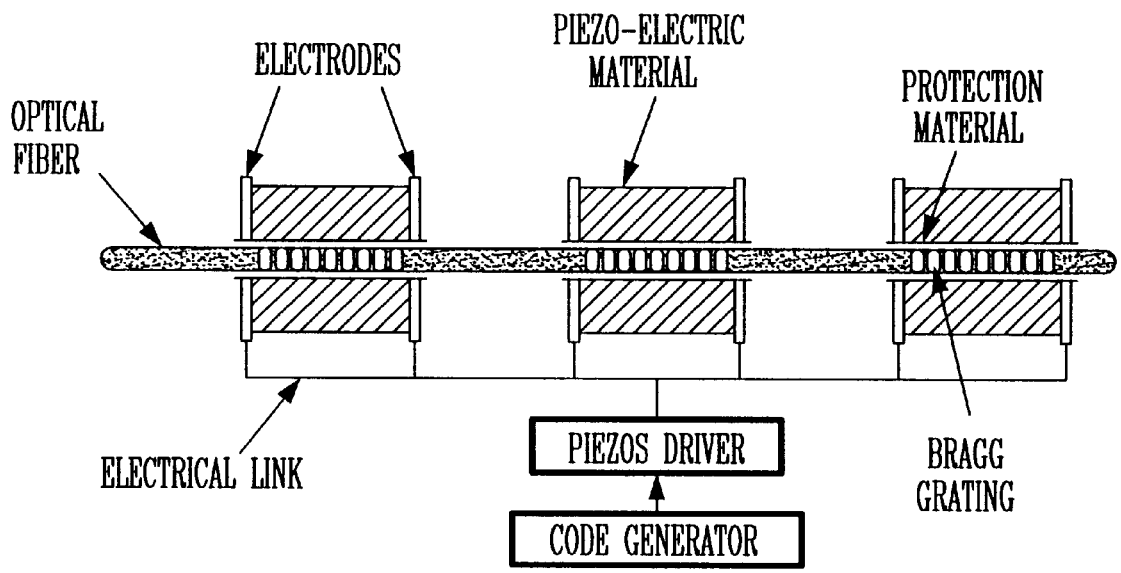
FIG. 20 is a schematic diagram of a programmable optical encoder/decoder device using piezoelectric devices.
Figure 21:
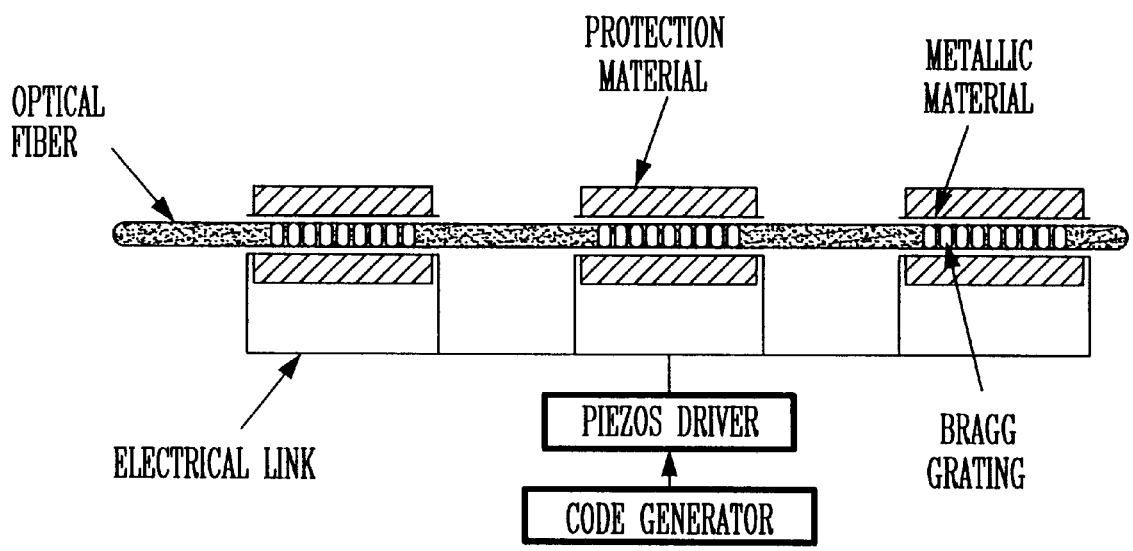
FIG. 21 is a schematic diagram of a programmable optical encoder/decoder device using temperature control.

Two preferred methods can be used to tune the Bragg grating: stretching or compression, and heating. FIG. 20 illustrates an arrangement in which the fiber grating is coated using piezoelectric material and an electric voltage is applied by the two electrodes placed at the ends. Each piezoelectric element thus created affects the amount of linear tension to which the fiber is subjected. FIG. 21 illustrates an arrangement in which the fiber coating is made with a conductive or metallic material and an electric voltage is applied to heat the grating in order to change its central wavelength.

Several integrated photonics devices in chalcogenide glasses could also be used to erase/write Bragg gratings, essentially in the center frequencies. Erbium doped fiber may also be capable of dynamically erasing/writing Bragg gratings. Voltage controlled electro-optic devices can also achieve the same functionality by changing the refractive index of the grating. The latter device can only be implemented in materials with large electro-optic coefficients, and thus require a special type of polymer fibers or gratings on integrated optical devices such as LiNbO3.

Figure 22:
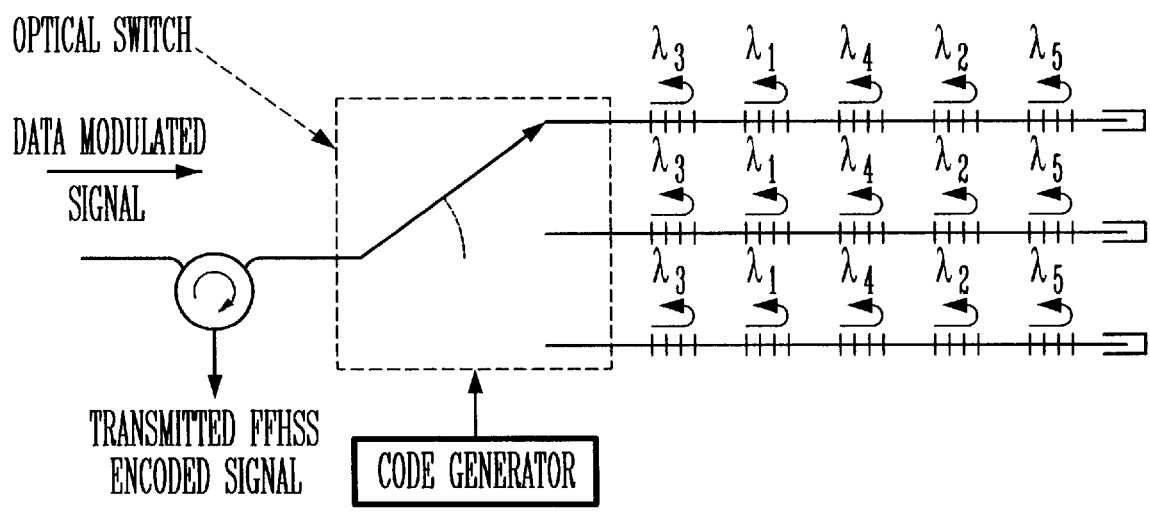
FIG. 22 is a schematic diagram of a programmable transmitter using a bank of gratings.

A combination of other optical spectrum slicing (or filtering) devices together with a bank of delay lines can also be used to achieve the same functionality. FIG. 22 shows a programmable transmitter where a bank of useful codes and a multi-position optical switch are used. The optical switch selects the position which corresponds to the selected code as prescribed by the code generator.

It is well known that some characteristics of several optical devices, such as lasers and gratings, change with the ambient temperature variation. For wavelength division multiplexing communication systems, laser stabilization is crucial to achieve transparency and avoid the cross-talk between channels. For Bragg gratings, when the ambient temperature changes, the effective period of the refractive index changes. This consequently varies the central frequency of the grating reflectivity. To select precisely the central frequency of the reflectivity, the Bragg grating temperature must be accurately controlled. For example, in FIG. 22, the adjustment of the Bragg grating frequency is achieved by controlling its temperature. In the following, it is explained how fast frequency hopping encoded information signals resist temperature variation in the transmitter environment. This property can substantially alleviate the temperature stabilization requirement in the transmitter.

Figure 23:
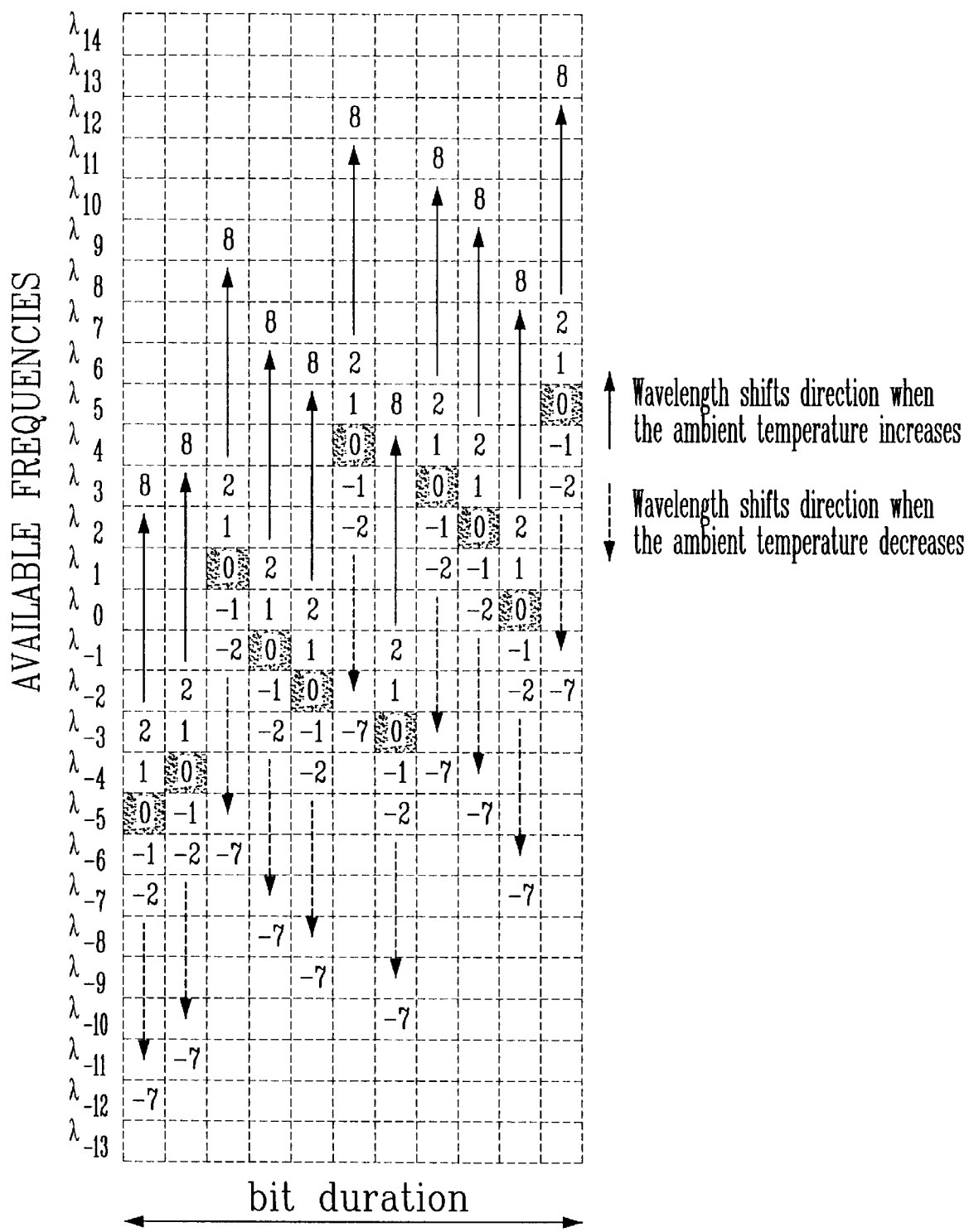
FIG. 23 is a graph of available frequencies versus bit duration illustrating the effect of temperature on the FFHSS transmitter signal.

If the environment temperature of a given frequency hopping optical transmitter according to the preferred embodiment Increases, all wavelengths of the transmitted FFHSS signal simultaneously and identically increase. If the broadband source signal is large and flat enough, the total transmitted energy does not change with the ambient temperature variation. In effect, the number of the sequence pulses and their energy do not change. Only the transmitted wavelengths change. FIG. 23 shows an example of an FFHSS encoded signal where the code is $s_0 = [\lambda_{-5}\lambda_{-4}\lambda_1\lambda_{-1}\lambda_2\lambda_4\lambda_{-3}\lambda_3\lambda_2\lambda_0\lambda_5]$, at the initial ambient transmitter temperature To (which corresponds to the squares marked by 0 in FIG. 23). Let DT be a positive amount of temperature variation which shift one grating wavelength from $l_k$ to $l_{k+1}$. When the ambient temperature increases by an amount DT, all gratings wavelengths shift to higher wavelengths. For a temperature $T_1=T_0+DT$, the resulting transmitted sequence will be $s+1 = [\lambda_{-4}\lambda_{-3}\lambda_2\lambda_0\lambda_{-1}\lambda_5\lambda_{-2}\lambda_4\lambda_3\lambda_1\lambda_6]$. If the temperature decreases to $T_{-7}=T_0-7*DT$ the effectively transmitted sequence will be $s_{-7} = [\lambda_{-12}\lambda_{-11}\lambda_{-6}\lambda_{-8}\lambda_{-9}\lambda_{-3}\lambda_{-10}\lambda_{-4}\lambda_{-5}\lambda_{-7}\lambda_{-2}]$. Let I be a vector of N−1 components, (10 in the example of FIG. 23), describing the wavelength number increment in the code. For example, the first component of I equals the second wavelength subscript of the code minus the first wavelength subscript. For CO, we calculate I=[(−4)−(−5) (−1)−(−4) (−1)−(1) (−2)−(−1) (4)−(−2) (−3)−(4) (3)−(−3) (2)−(3) (0)−(2) (5)−(0)]=[1 5 −2 −1 6 −7 6 −1 −2 5]. It will be appreciated that the codes s1 and s−7 lead to the same increment vector I. This means that the environment temperature variation changes the wavelengths but not the increment vector I.

In a system where the transmitters are not stabilized in temperature, the increment of FFHSS code is sufficient for the receiver to decode the message. In the reception end, using the increment vector, the receiver can start from any possible frequency sequence which verify the desired increment vector. If the decoded signal using the first selected sequence does not exceed the threshold, the receiver simultaneously and identically translates the sequence frequency until a high output peak is obtained corresponding to the transmitted signal at the real transmitter environment temperature.

It is important to note that this resistance property is inherent to the FFHSS signal structure and not the transmitting process. Here we described the case of Bragg grating based transmitter, but the mentioned properties are more general. For a transmitter based on a laser array, when the temperature shifts, all the transmitted frequencies shift. In the reception end, an array of photodetectors, where each of which selects a different wavelength can be used.

Figure 24:
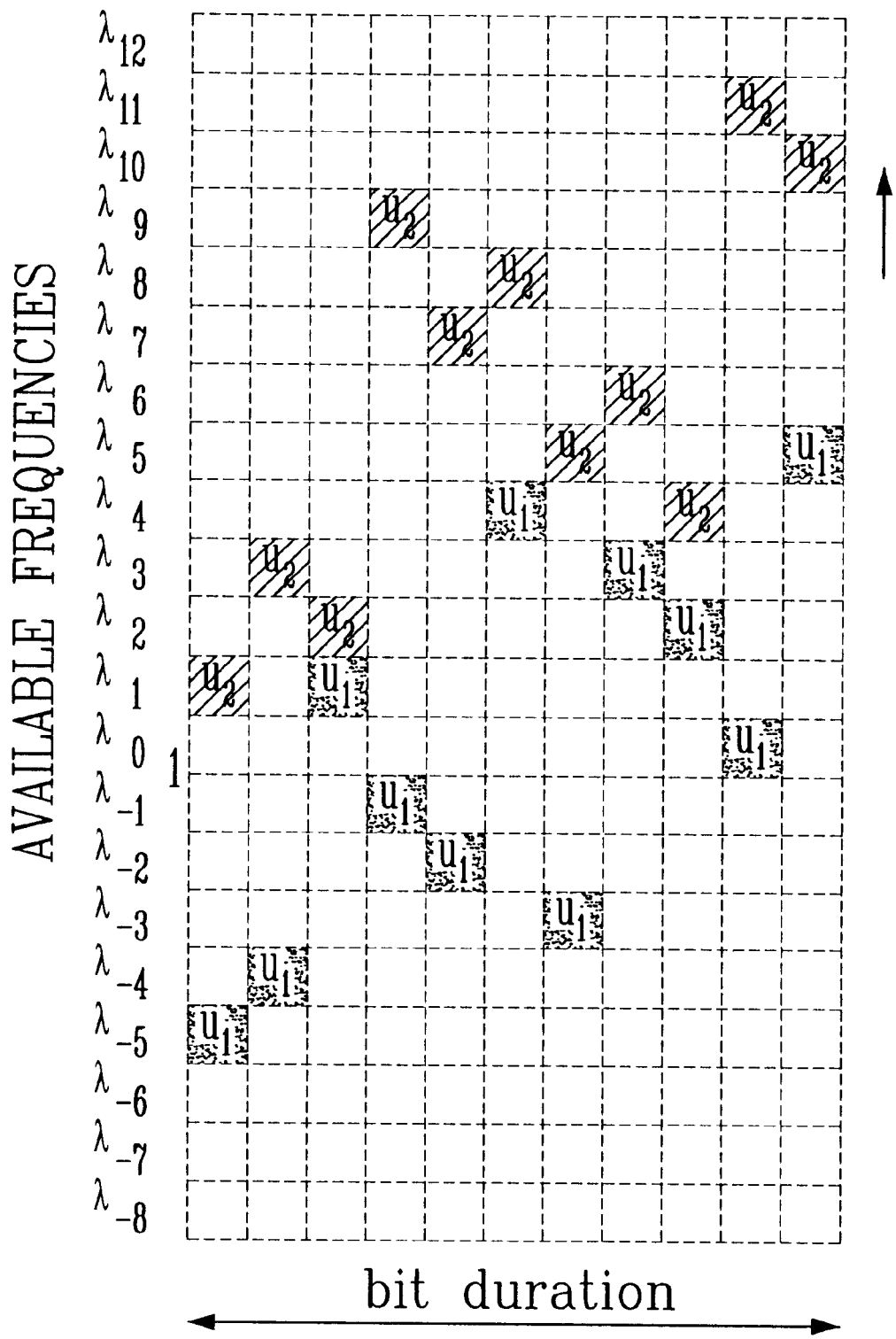
FIG. 24 is a graph of available frequencies versus bit duration illustrating two hyperbolic user codes.

FIG. 24 shows simultaneously two hyperbolic codes corresponding to two different users u1 and u2. The Increment vector of u1 is I1=[1 5 −2 −1 6 −7 6 −1 −2 5] and the increment vector of u2 is I2=[2 −1 7 −2 1 −3 1 −2 7 −1]. No user of them is stabilized in temperature. The receiver which wants to recover the date of user u2 for example, needs only the increment vector 12. The shown user u2 sequence is [I1 I3 I2 I9 I7 I8 I5 I6 I4 I11 I10] and corresponds to the temperature T0. The real transmitted sequence is in general a translated copy of this sequence. The selection of the two codes is based on their increment vectors so that for any wavelength relative shift between the two users' codes, the receiver can successfully recover the desired user signal using threshold comparison.

This property is particularly interesting for fiber-optic based sensors where we need to multiplex many sensor signals to one fiber. The same principle can be used to measure the temperature of the transmitter. To measure the transmitter end temperature, the receiver must know in advance the transmitted sequence for particular temperature value and detect the real transmitted one. Using the measured frequency shift the receiver can estimate the temperature variation of the transmitter end. The same principle can be also used to measure and multiplex other environmental parameters.

Figure 25:
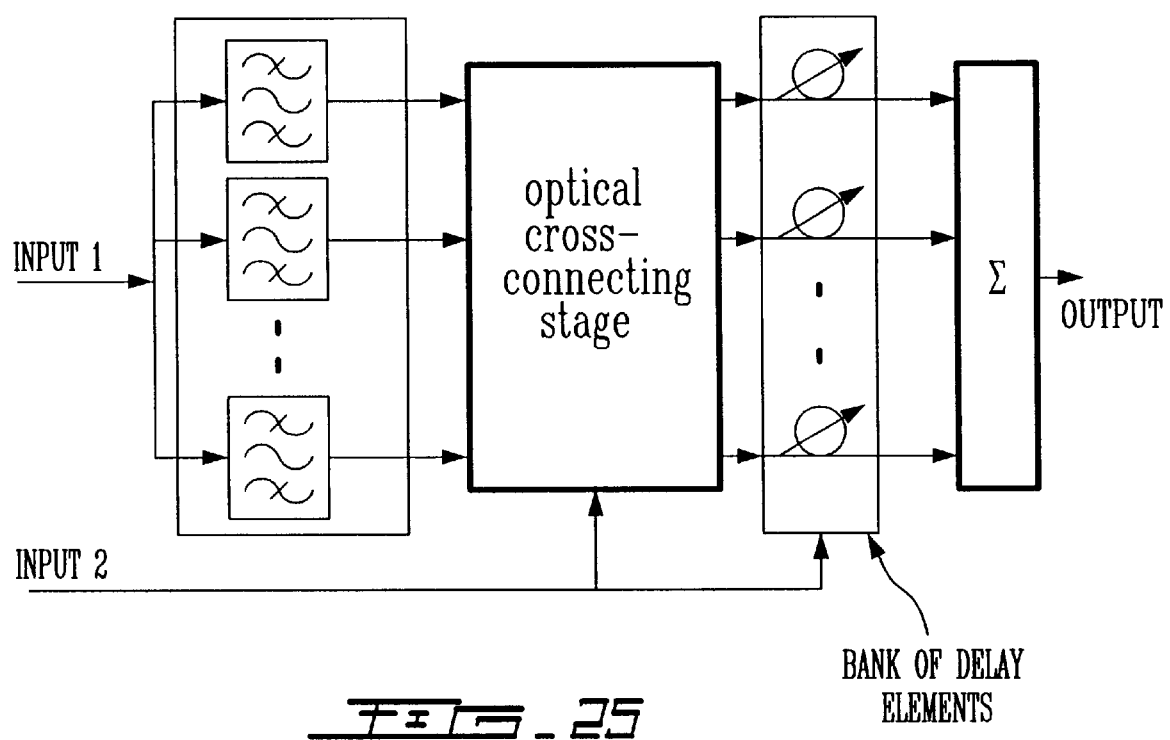
FIG. 25 is a block diagram of a programmable encoding/decoding device according to an alternative embodiment.

FIG. 25 shows another alternative block diagram which describes a possible arrangement of optical elements to perform the functions of ENC; $200_1$ and DEC $200_2$. In place of using adjustable band pass filters and fixed delay elements we can use fixed band pass filters and variable delay elements. Variable delay elements can be released by optical cross-connecting switch and a bank of delay lines.

Although the invention has been described herein with reference to specific embodiment, it is to be understood that other embodiment are contemplated within the scope of the present invention, as defined in the appended claims.

We claim:

1. A method of optical signal transmission comprising the steps of:
   generating a multi-wavelength optical signal modulated to encode data and occupy a predetermined fraction of a bit time slot;
   selecting a plurality of wavelength division slots within a wavelength range of said multi-wavelength signal;
   introducing, according to a code, a predetermined time delay in spectral components of said multi-wavelength optical signal corresponding to each of said plurality of wavelength division slots to displace said spectral components within said bit time slot; and
   feeding said spectral components delayed according to said code into a waveguide transmission medium shared by at least one other transmitter using said wavelength division slots and a different code.

2. The method as claimed in claim 1, wherein said step of introducing said predetermined time delay comprises providing an in-waveguide Bragg grating device having a plurality of spaced Bragg grating reflectors for reflecting said spectral component time delayed according to said code.

3. The method as claimed in claim 2, wherein said step of introducing further comprises providing an optical circulator, coupling said optical signal to a first port of said circulator, coupling said in-waveguide Bragg grating device to a second port of said circulator, and coupling a third port of said circulator to said waveguide transmission medium.

4. The method as claimed in claim 3, wherein said in-waveguide Bragg grating device comprises an in-fiber Bragg grating.

5. The method as claimed in claim 4, wherein said code utilizes fewer than all of said wavelength division slots and a bit time slot is used which is shorter than a bit time slot used when all of said wavelength division slots are utilized, whereby a shorter code length may be used to achieve a higher bit rate.

6. The method as claimed in claim 1, wherein said code utilizes fewer than all of said wavelength division slots and a bit time slot is used which is shorter than a bit time slot used when all of said wavelength division slots are utilized, whereby a shorter code length may be used to achieve a higher bit rate.

7. The method as claimed in claim 1, wherein said step of introducing said predetermined time delay comprises providing a programmable in-waveguide Bragg grating device having a plurality of tunable spaced Bragg grating reflectors for reflecting said spectral component time delayed according to said code, and tuning said Bragg grating reflectors according to said code.

8. The method as claimed in claim 7, wherein said tuning comprises adjusting a temperature control of a temperature control device for each of said Bragg grating reflectors.

9. The method as claimed in claim 7, wherein said tuning comprises adjusting a voltage control of a piezoelectric element for each of said Bragg grating reflectors.

10. A method of optical communication comprising the steps of:
    generating a multi-wavelength optical signal modulated to encode data and occupy a predetermined fraction of a bit time slot at a transmitter end;
    selecting a plurality of wavelength division slots within a wavelength range of said multi-wavelength signal;
    introducing, according to a code, a predetermined time delay in spectral components of said multi-wavelength optical signal corresponding to each of said plurality of wavelength division slots to displace said spectral components within said bit time slot;
    feeding said spectral components delayed according to said code into a waveguide transmission medium shared by at least one other transmitter using said wavelength division slots and a different code;
    receiving said optical signal from said transmission medium; and
    detecting said displaced spectral components according to said code to recover said data.

11. The method as claimed in claim 10, wherein said step of detecting comprises:
    introducing, according to a reverse code complementary to said code, a predetermined time delay in spectral components of said multi-wavelength optical signal corresponding to each of said plurality of wavelength division slots to displace said spectral components within said bit time slot; and
    detecting only within said predetermined fraction of said bit time slot signal energy of said received optical signal.

12. The method as claimed in claim 11, wherein said step of receiving comprises compensating for chromatic dispersion caused by said transmission medium.

13. The method as claimed in claim 11, wherein said transmitter end is subject to temperature variations affecting a wavelength of said spectral components, said step of detecting comprises providing a programmable in-waveguide Bragg grating device having a plurality of tunable spaced Bragg grating reflectors for reflecting said spectral component time delayed according to said code, and tuning said Bragg grating reflectors to compensate for said temperature variations.

14. The method as claimed in claim 13, wherein said tuning comprises adjusting a temperature control of a temperature control device for each of said Bragg grating reflectors.

15. The method as claimed in claim 13, wherein said tuning comprises adjusting a voltage control of a piezoelectric element for each of said Bragg grating reflectors.

16. The method as claimed in claim 11, wherein said code utilizes fewer than all of said wavelength division slots and a bit time slot is used which is shorter than a bit time slot used when all of said wavelength division slots are utilized, whereby a shorter code length may be used to achieve a higher bit rate, said step of detecting including steps of:

detecting any signal present in at least one unused ones of said wavelength division slots at predetermined time delays; and subtracting said signal detected in the previous step from said displaced spectral components according to said code in order to recover said data.

17. The method as claimed in claim 10, wherein said step of receiving comprises compensating for chromatic dispersion caused by said transmission medium.

18. The method as claimed in claim 10, wherein said code utilizes fewer than all of said wavelength division slots and a bit time slot is used which is shorter than a bit time slot used when all of said wavelength division slots are utilized, whereby a shorter code length may be used to achieve a higher bit rate, said step of detecting including steps of:

detecting any signal present in at least one unused ones of said wavelength division slots at predetermined time delays; and subtracting said signal detected in the previous step from said displaced spectral components according to said code in order to recover said data.

19. The method as claimed in claim 10, wherein said code utilizes fewer than all of said wavelength division slots and a bit time slot is used which is shorter than a bit time slot used when all of said wavelength division slots are utilized, whereby a shorter code length may be used to achieve a higher bit rate.

20. A method of fast frequency hopping spread spectrum communication comprising the steps of:

generating a multi-frequency source signal occupying a wide frequency band;

modulating said source signal to encode data and occupy a predetermined fraction of a bit time slot at a transmitter end;

selecting a plurality of frequency division slots within said wide frequency band;

introducing, according to a code, a predetermined time delay in spectral components of said modulated source signal corresponding to each of said plurality of frequency division slots to displace said spectral components within said bit time slot;

transmitting said spectral components delayed according to said code over a medium shared by at least one other transmitter using said frequency division slots and a different code;

receiving said transmitted spectral components from said transmission medium, and detecting said temporally displaced spectral components according to said code to recover said data.

* * * * *